US012198174B2

(12) United States Patent
Nentwig et al.

(10) Patent No.: US 12,198,174 B2
(45) Date of Patent: Jan. 14, 2025

(54) CONNECTOR CONFIGURATOR

(71) Applicant: TE Connectivity Germany GmbH, Bensheim (DE)

(72) Inventors: Anne Nentwig, Bensheim (DE); Rolf Jetter, Darmstadt (DE); Hans-Juergen Brueck, Bad Endbach (DE); Matthias Lechner, Moerlenbach (DE); Zoran Stjepanovic, Darmstadt (DE)

(73) Assignee: TE Connectivity Germany GmbH, Bensheim (DE)

( * ) Notice: Subject to any disclaimer, the term of this patent is extended or adjusted under 35 U.S.C. 154(b) by 239 days.

(21) Appl. No.: 17/181,489

(22) Filed: Feb. 22, 2021

(65) Prior Publication Data
US 2022/0270149 A1 Aug. 25, 2022

(51) Int. Cl.
| | | |
|---|---|---|
| *G06Q 30/00* | (2023.01) | |
| *G06F 30/31* | (2020.01) | |
| *G06F 30/367* | (2020.01) | |
| *G06F 30/398* | (2020.01) | |
| *G06Q 30/0601* | (2023.01) | |
| *G06F 111/16* | (2020.01) | |
| *G06F 119/08* | (2020.01) | |

(52) U.S. Cl.
CPC ......... *G06Q 30/0621* (2013.01); *G06F 30/31* (2020.01); *G06F 30/367* (2020.01); *G06F 30/398* (2020.01); *G06Q 30/0643* (2013.01); *G06F 2111/16* (2020.01); *G06F 2119/08* (2020.01)

(58) Field of Classification Search
CPC ................................................ G06Q 30/0621
See application file for complete search history.

(56) References Cited

U.S. PATENT DOCUMENTS

| | | | | |
|---|---|---|---|---|
| 11,232,503 | B1 * | 1/2022 | Rodriguez | G06Q 20/401 |
| 2002/0107763 | A1 * | 8/2002 | Palmer | G06Q 30/02 705/29 |
| 2003/0064614 | A1 * | 4/2003 | Tanaka | H01R 13/6581 439/98 |
| 2003/0172003 | A1 * | 9/2003 | Holbrook | G06Q 10/087 705/26.1 |

(Continued)

OTHER PUBLICATIONS

Sun, Chengtong, Research and realization of the web-based product customization and simulation system based on VP, Jun. 1, 2011, 2011 6th IEEE Conference on Industrial Electronics and Applications, pp. 391-395 (Year: 2011).*

*Primary Examiner* — Jeffrey A. Smith
*Assistant Examiner* — Timothy J Kang
(74) *Attorney, Agent, or Firm* — Barley Snyder

(57) ABSTRACT

A connector configurator includes a connector configuration system and a customer connected to the connector configuration system. The connector configuration system has a configuration processor and a configurator module executable by the configuration processor. The customer has a display. The customer accesses the configurator module to receive a plurality of interface data displayed on the display. The customer transmits selections of the interface data to the connector configuration system to create a configured connector using the configurator module. The configurator module displays the configured connector on the display based on the transmitted selections of the interface data.

12 Claims, 24 Drawing Sheets

(56) References Cited

U.S. PATENT DOCUMENTS

| | | | |
|---|---|---|---|
| 2015/0154677 A1* | 6/2015 | Banerjee | G06Q 30/0621 |
| | | | 716/139 |
| 2015/0324490 A1* | 11/2015 | Page | G06Q 30/0621 |
| | | | 700/98 |
| 2016/0275583 A1* | 9/2016 | Cambianica | G05B 15/02 |
| 2017/0052682 A1* | 2/2017 | Agsteiner | G06Q 30/0621 |
| 2020/0005377 A1* | 1/2020 | Hashimoto | G06Q 30/0621 |
| 2020/0293024 A1* | 9/2020 | Pail | G05B 19/4097 |
| 2021/0133670 A1* | 5/2021 | Cella | G06N 5/04 |

* cited by examiner

CONNECTOR CONFIGURATOR

FIELD OF THE INVENTION

The present disclosure relates to a configurator and, more particularly, to a configurator for configuring a connector.

BACKGROUND

Connectors, such as electrical connectors or data connectors, are available in a wide array of configurations for a wide array of applications. A customer purchasing such a connector from a connector manufacturer, while aware of the requirements of the connector for the customer's intended application, such as the number of leads, currents applied, temperature of the environment, and/or necessary data rates, often have difficulty selecting the appropriate connector from the manufacturer. The customer often does not have the necessary knowledge of the connectors to determine which connector best suits the intended application.

Most commonly, a customer will contact a manufacturer with the requirements of the connector and await a response from an engineer at the manufacturer. The response from the engineer often requires further revision from the customer. The iterative process of designing or finding an appropriate available connector between the customer and the engineer is inefficient in requiring significant time and numerous communications. Further, the currently available connector selection process does not allow for significant customization from the customer and can result in the selection of a connector that is not ideally suited for the application.

SUMMARY

A connector configurator includes a connector configuration system and a customer connected to the connector configuration system. The connector configuration system has a configuration processor and a configurator module executable by the configuration processor. The customer has a display. The customer accesses the configurator module to receive a plurality of interface data displayed on the display. The customer transmits selections of the interface data to the connector configuration system to create a configured connector using the configurator module. The configurator module displays the configured connector on the display based on the transmitted selections of the interface data.

BRIEF DESCRIPTION OF THE DRAWINGS

The invention will now be described by way of example with reference to the accompanying Figures, of which:

FIG. 12 is another schematic diagram of a plurality of interface data in a step of the configuration process;

FIG. 14 is another schematic diagram of a plurality of interface data in a step of the configuration process;

DETAILED DESCRIPTION OF THE EMBODIMENT(S)

Figure 1:
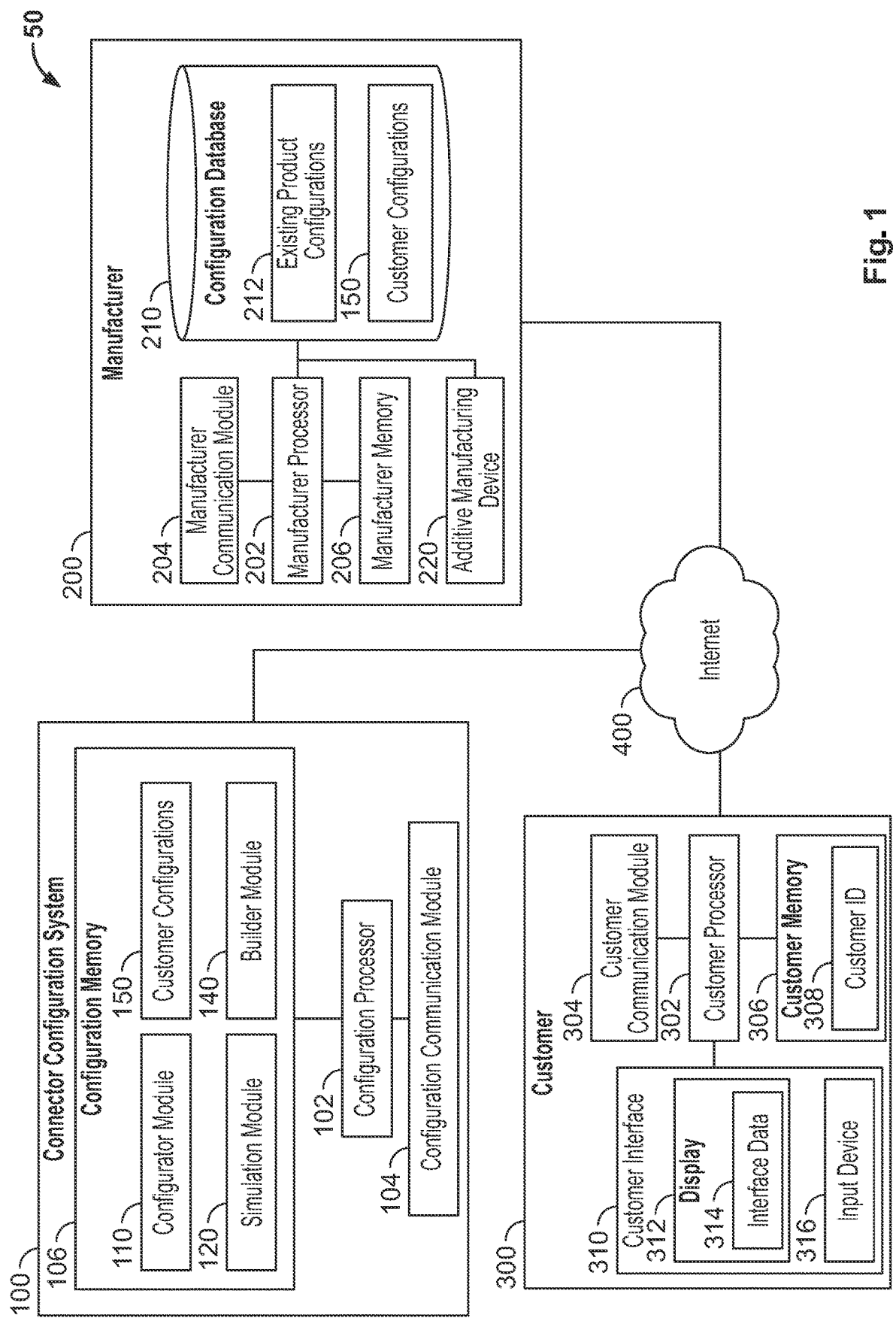
FIG. 1 is a block diagram of a connector configurator according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A connector configurator 50 according to an embodiment, as shown in FIG. 1, comprises a connector configuration system 100, a manufacturer 200, and a customer 300 connected to one another. The connector configuration system 100, the manufacturer 200, and the customer 300, in the shown embodiment, are connected by the Internet 400. In other embodiments, the connector configuration system 100, the manufacturer 200, and the customer 300 can be connected by any wireless connection, wired connection, or combination of wireless and wired connections that allow the exchange of data and instructions as described herein.

In the following, the components of the connector configuration system 100, the manufacturer 200, and the customer 300 will be described first, primarily with respect to FIG. 1. A detailed explanation of the various functions and processes of the connector configurator 50 will follow the explanation of the components.

The connector configuration system 100, as shown in FIG. 1, includes a configuration processor 102, a configuration communication module 104 connected to the configuration processor 102, and a configuration memory 106 connected to the configuration processor 102. The configuration processor 102 may be any type of computing processor, such as a microprocessor, capable of performing the functions described herein. The configuration communication module 104, in the shown embodiment, is a router connecting the connector configuration system 100 to the Internet 400 and capable of exchanging data through the Internet 400. In other embodiments, the configuration communication module 104 can be any type of communication module that allows the exchange of data over a wired or a wireless connection. The configuration processor 102 can be connected to the configuration communication module 104 by a wired or a wireless connection.

Figure 2:
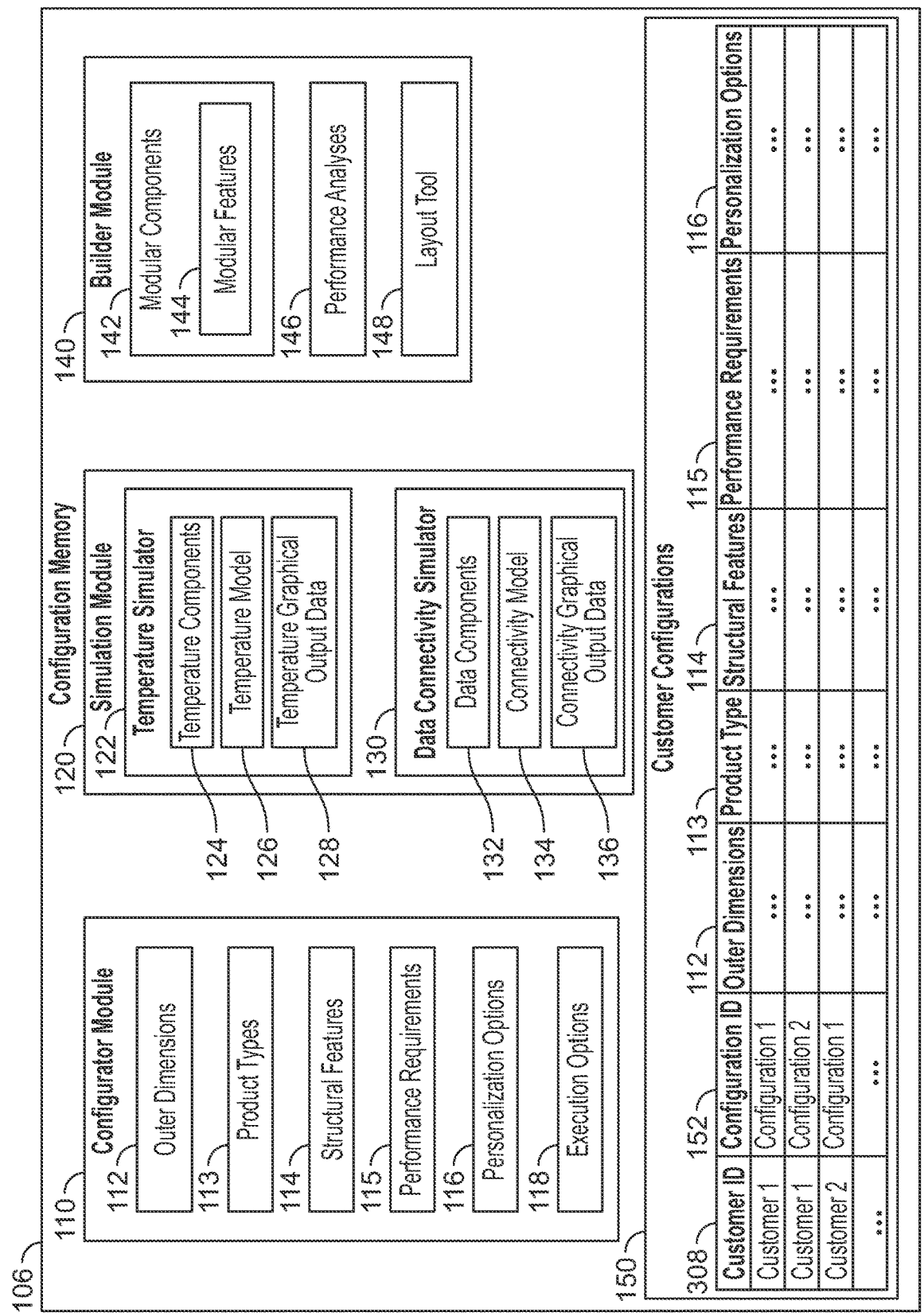
FIG. 2 is a block diagram of a configuration memory of a connector configuration system of the connector configurator.

The configuration memory 106 is a non-transitory computer readable medium storing a plurality of instructions thereon that, when executed by the configuration processor 102, perform the functions of the configuration processor 102 or the connector configuration system 100 described herein. The configuration memory 106, as shown in FIGS. 1 and 2, stores a plurality of modules 110, 120, 140 and a plurality of customer configurations 150. The modules 110, 120, 140 include a configurator module 110, a simulation module 120, and a builder module 140. Each of the modules 110, 120, 140 is a set of instructions that, when executed by the configuration processor 102, perform the functions of the particular module 110, 120, 140 described in detail below. The customer configurations 150, as described in greater detail below, are configurations of connectors created by customers 300 using the connector configuration system 100.

The manufacturer 200, as shown in FIG. 1, is a computing system including a manufacturer processor 202, a manufacturer communication module 204 connected to the manufacturer processor 202, and a manufacturer memory 206 connected to the manufacturer processor 202. The manufacturer processor 202 may be any type of computing processor, such as a microprocessor, capable of performing the functions described herein. The manufacturer communication module 204, in the shown embodiment, is a router connecting the manufacturer 200 to the Internet 400 and capable of exchanging data through the Internet 400. In other embodiments, the manufacturer communication module 204 can be any type of communication module that allows the exchange of data over a wired or a wireless connection. The manufacturer processor 202 can be connected to the manufacturer communication module 204 by a wired or a wireless connection. The manufacturer memory 206 is a non-transitory computer readable medium storing a plurality of instructions thereon that, when executed by the manufacturer processor 202, perform the functions of the manufacturer processor 202 or the manufacturer 200 described herein.

As shown in FIG. 1, the manufacturer 200 has a configuration database 210 connected to the manufacturer processor 202. The configuration database 210 may be any type of computing database capable of storing the data described herein. The configuration database 210 stores a plurality of existing product configurations 212 and the customer configurations 150 that are also stored in the configuration memory 106. The existing product configurations 212 are details of various connectors currently manufactured by the manufacturer 200, as described in greater detail below. The configuration database 210 is connected to the manufacturer processor 202 by a wired or a wireless connection, and the manufacturer processor 202 is capable of both retrieving data from the configuration database 210 for further transmittal and storing received data in the configuration database 210.

In the embodiment shown in FIG. 1, the manufacturer 200 has an additive manufacturing device 220 connected to the manufacturer processor 202. The additive manufacturing device 220 may be any type of 3D printing device capable of printing in a range of materials, such as a stereolithography device, a digital light processing device, or a fusion deposition modeling device. The additive manufacturing device 220 is controlled by the manufacturer processor 202.

In the embodiment of the connector configurator 50 shown in FIG. 1, the connector configuration system 100 and the manufacturer 200 are shown as separate systems connected to one another through the Internet 400. In another embodiment, the connector configuration system 100 is part of the manufacturer 200. In this embodiment, the configuration processor 102 and the configuration communication module 104 are omitted, and the modules 110, 120, and 140 are stored on the manufacturer memory 206; the manufacturer processor 202 performs all the functions of the configuration processor 102 and the manufacturer communication module 204 performs all the functions of the configuration communication module 104. Otherwise, in both embodiments, the components and function of the connector configurator 50 described in detail below are the same.

The customer 300, as shown in FIG. 1, is a computing device including a customer processor 302, a customer communication module 304 connected to the customer processor 302, and a customer memory 306 connected to the customer processor 302. The customer processor 302 may be any type of computing processor, such as a microprocessor, capable of performing the functions described herein. The customer communication module 304, in the shown embodiment, is a wireless network card or an Ethernet port connecting the customer 300 to the Internet 400 and capable of exchanging data through the Internet 400. In other embodiments, the customer communication module 302 can be any type of communication module that allows the exchange of data over a wired or a wireless connection. The customer memory 306 is a non-transitory computer readable medium storing a plurality of instructions thereon that, when executed by the customer processor 302, perform the functions of the customer processor 302 or the customer 300 described herein. The customer memory 306, as shown in FIG. 1, stores a customer ID 308 that is unique to the customer 300.

As shown in FIG. 1, the customer 300 has a customer interface 310 connected to the customer processor 302. The customer interface 310 has a display 312 capable of presenting interface data 314 including text and/or images to a user and has an input device 316 capable of receiving inputs from the user. The display 312 may be a separate monitor, a screen integrated into a computing device, or any other type of device capable of presenting the interface data 314 described herein. The input device 316 may be a mouse, a keyboard, a capacitive touch element of the display 312, or any other types of input device 316 usable with a computing device and capable of receiving the user inputs described herein.

The customer 300, in various embodiments, can be a computing device such as a desktop computer, a laptop, a tablet, or any other kind of mobile device, such as a smartphone, provided that the customer 300 has the components described herein capable of performing the functions described herein.

The embodiment of the connector configurator 50 shown in FIG. 1 shows one customer 300 connected via the Internet 400 to the connector configuration system 100 and the manufacturer 200. The connector configurator 50 allows a plurality of different customers 300 to connect to the same connector configuration system 100 and manufacturer 200, however, the description below will focus on one particular customer 300 for ease and clarity of explanation.

A configuration process 500 by which the customer 300 uses the connector configuration system 100 to configure a connector will now be described primarily with reference to FIGS. 3A and 3B.

Figure 3A:
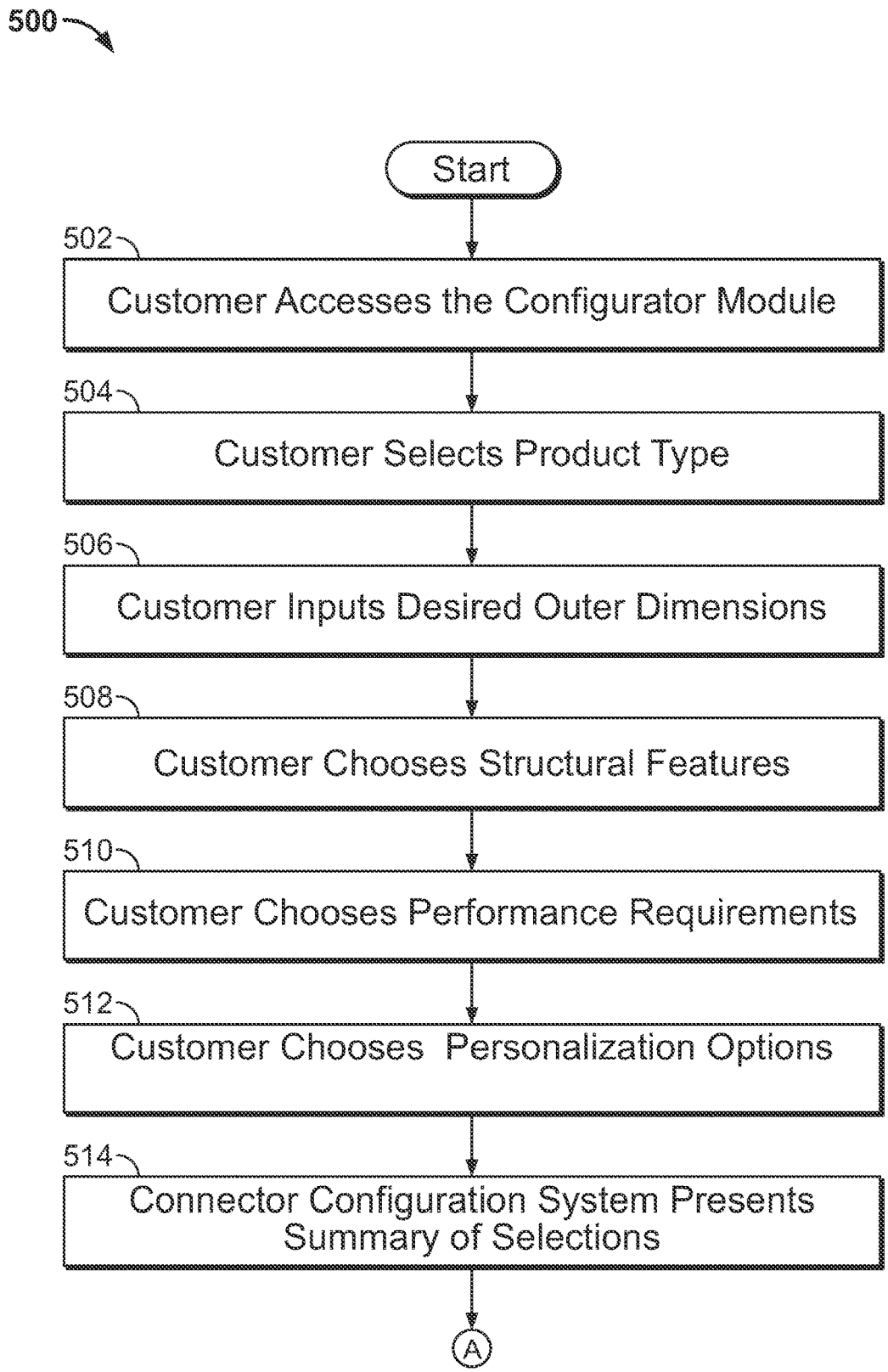
FIG. 3A if a flowchart of a configuration process of the connector configurator.

In a step 502 shown in FIG. 3A, the customer 300 accesses the configurator module 110 of the connector configuration system 110. The customer processor 302, based on an input at the input device 316 of the customer interface 310, outputs a request for data from the configurator module 110 through the customer communication module 304. The configuration communication module 104 receives the request for the configurator module 110, via the Internet 400 in the embodiment shown in FIG. 1, and the configuration processor 102 accesses the configurator module 110.

As shown in FIG. 2, the configurator module 110 includes a plurality of product types 113. The product types 113 are types of connectors that are capable of being configured with the connector configuration system 100. In an embodiment, the product types 113 include a low voltage type 113a shown for example in FIGS. 5-7, a high voltage type 113b shown for example in FIG. 8, and a data type 113c shown for example in FIG. 9. In other embodiments, the product types 113 could include a larger number of types, different types, or any other categorical arrangement of types of connectors capable of being manufactured by the manufacturer 200.

In the step 502 shown in FIG. 3A, the configuration processor 102 retrieves the product types 113 from the configurator module 110 and transmits the product types 113 to the customer 300 through the communication modules 104, 304 as similarly described above. The description of the processors 102, 202, 302 controlling the respective communication modules 104, 204, 304 to communicate through the Internet 400 will not be repeated in each instance herein for simplicity of the description, instead referred to simply as communication, sending, or transmitting of data generally between the connector configuration system 100, the manufacturer 200, and the customer 300. The more detailed description above, however, applies equally in each instance. The customer 300 receives the product types 113 and, in the step 502, the customer processor 302 controls the display 312 to present the product types 113.

In a step 504 shown in FIG. 3A, a user at the customer 300 uses the input device 316 to select the desired product type 113 on the display 312. A display updating process 600 shown in FIG. 4 then occurs by interaction between the customer 300 and the connector configuration system 100. Because the display updating process 600 occurs frequently throughout the configuration process 500, it will now be described in detail once and then referenced throughout the remainder of the description of the configuration process 500.

In a step 610 of the display updating process 600, the customer 300 makes a selection among a plurality of interface data 314 on the display 312 using the input device 316. The interface data 314, as described in greater detail below, can be any type of field or modifiable element displayed on the display 312, such as a field that is fillable or checkable with the input device 316, a slider that is movable by the input device 316, a tab that is selectable by the input device 316, or an image that is capable of being manipulated by the input device 316. In an embodiment, for example, a user at the customer 300 uses the input device 316 to select a box of the interface data 314 corresponding to the selected product type 113 in the step 504.

Figure 4:
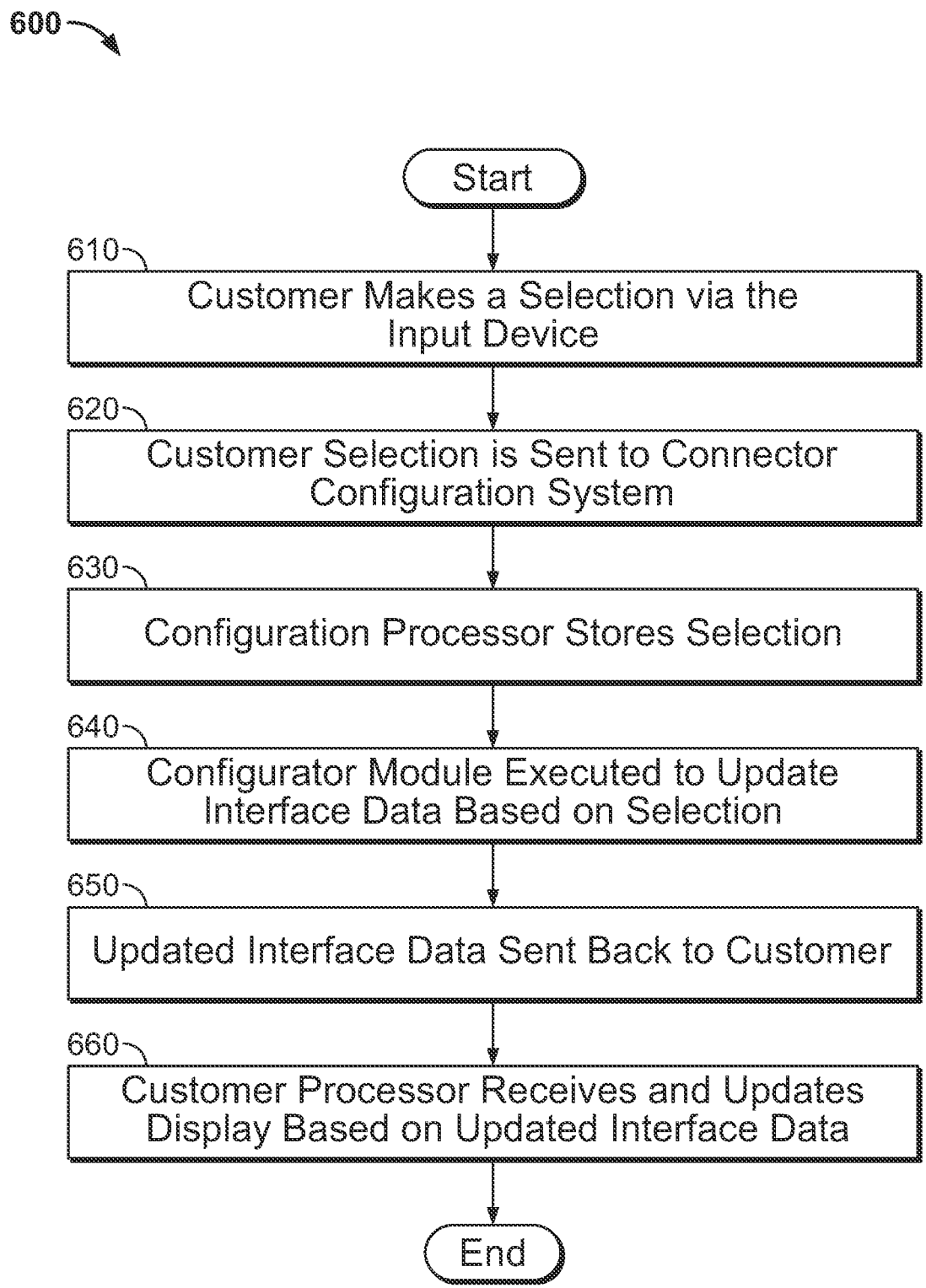
FIG. 4 is a flowchart of a display updating process of the configuration process.

In a step 620 shown in FIG. 4, the customer processor 302 receives the selection from step 610 and transmits the selection to the connector configuration system 100 along with the customer ID 308 corresponding to the selection.

The configuration processor 102 receives the selection and, in a step 630 shown in FIG. 4, stores the selection associated with the customer ID 308 in the customer configurations 150. As shown in FIG. 2, the customer configurations 150 includes a plurality of entries each corresponding to one customer ID 308 and a configuration ID 152. The configuration ID 152 is different for each configured connector 30 described below and can be used to differentiate connectors 30 configured by the same customer 300. Each entry associated with one customer ID 308 and one configuration ID 152 is stored with the properties of the configured connector selected by the customer 300. For example, the customer configurations 150 store the product type 113 selected in step 504 with the customer ID 308 and configuration ID 152.

In a step 640 shown in FIG. 4, the configuration processor 102 executes the configurator module 110 to update the interface data 314 based on the selection from the customer 300. The updating of the interface data 314 can be any change to the interface data 314, including anything ranging from a small change in a portion of the display 312 to an entire change of all elements that are displayed on the display 312. In an embodiment, for example, the updating of the interface data 314 simply indicates, by check mark or otherwise, that the user has selected a box of the interface data 314. In another embodiment, for example, the updating of the interface data 314 indicates that the user has selected an element of the interface data 314 and changes an image of the interface data 314 based on the selection. In another embodiment, for example, the updating of the interface data 314 is an entirely new set of interface data 314 for a next step of the configuration process 500. A selection of the product type 113 in step 504, for example, results in the retrieval of entirely different interface data 314 shown in FIG. 5, as described in detail below.

In a step 650 shown in FIG. 4, the configuration processor 102 sends the updated interface data 314 back to the customer 300. The customer processor 302 receives the updated interface data 314 and, in a step 660, displays the updated interface data 314 on the display 312. The same display updating process 600 is executed for each selection made at the customer 300 throughout the configuration process 500.

Returning to the step 504 of the configuration process 500 in FIG. 3A, the selection of the product type 113 on the customer interface 310 results in execution of the display updating process 600, storing the selection of the product type 113 in the customer configurations 150 and presenting new or updated interface data 314 at the customer 300. An exemplary embodiment of the interface data 314 presented on the display 312 after selection of the product type 113 is shown in FIG. 5.

In a step 506 shown in FIG. 3A, the user at the customer 300 uses the input device 316 to input a plurality of outer dimensions 112 desired for a configured connector 30. The available outer dimensions 112 for each product type 113 are stored in the configurator module 110, as shown in FIG. 2. In the embodiment shown in FIG. 5, the user enters the desired outer dimensions 112 in a plurality of fields 314a of the interface data 314. The interface data 314 in the embodiment shown in FIG. 5 also includes, for example, a button 314b that allows toggling of the language presented in the interface data 314 and a button 314b that allows a user to move to the next step of the configuration process 500. In the embodiment shown in FIG. 5, the interface data 314 also includes an image 314c of the configured connector 30; the image 314c can be a two-dimensional image or a three-dimensional model. The configured connector 30, in the embodiment shown in FIG. 5, is a low voltage type 113a.

Figure 5:
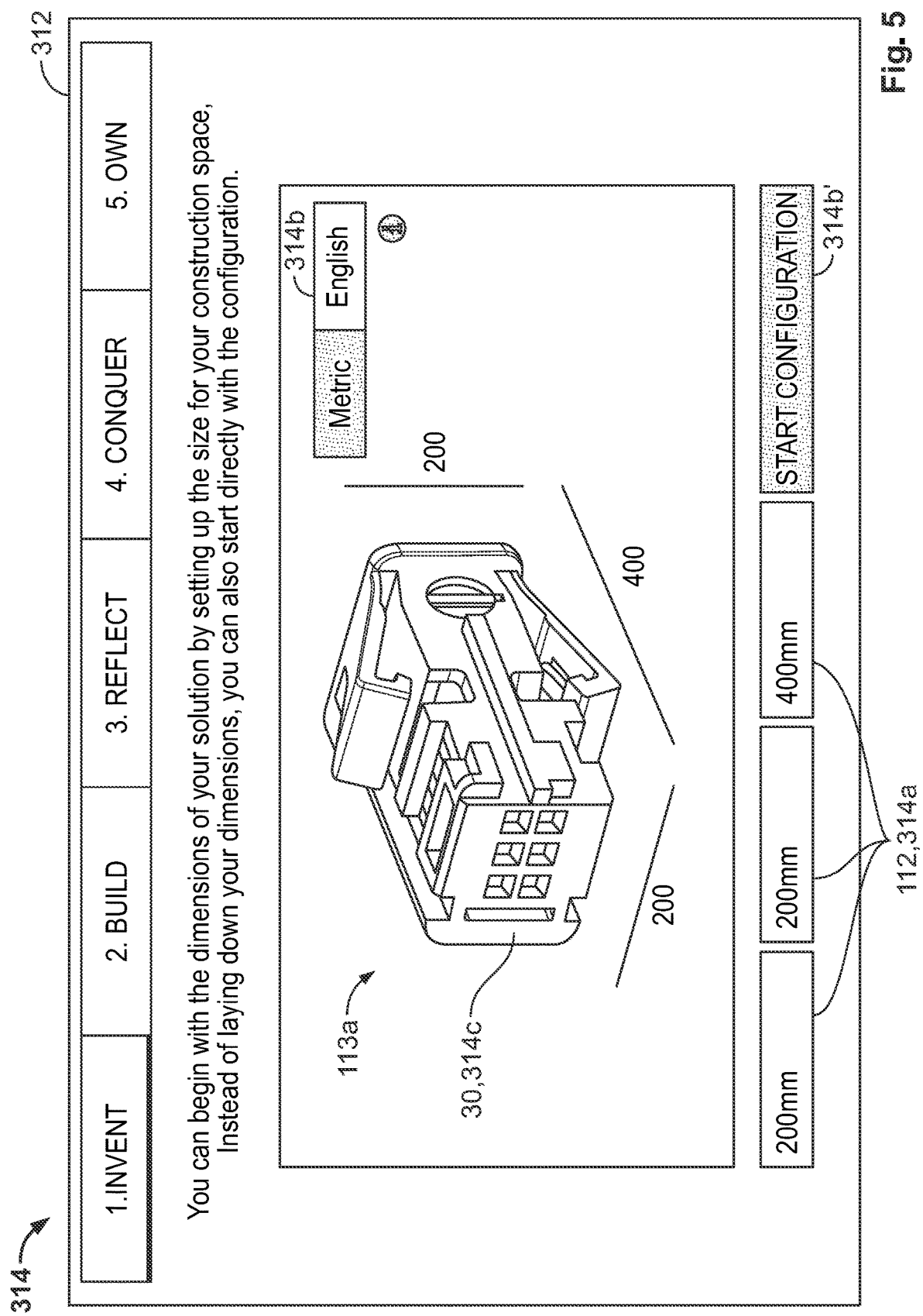
FIG. 5 is a schematic diagram of a plurality of interface data in a step of the configuration process.

Once the user inputs the outer dimensions 112 for the configured connector 30 in the step 506, the display updating process 600 is executed to store the outer dimensions 112 in the customer configurations 150, as shown in FIG. 2, and updates the image 314c to display the input outer dimensions 112 as shown in FIG. 5. During execution of the display updating process 600 based on the input outer dimensions 112, the configuration processor 102 executes the configurator module 110 to verify that the input outer dimensions 112 are available outer dimensions 112 for the chosen product type 113. The user at the customer 300 selects the button 314b' proceeding to the next step of the configuration process 500 when the user is satisfied with the input outer dimensions 112 in step 506, executing the display updating process 600 to present new interface data 314 on the display 312 shown, for example, in FIG. 6.

In a step 508 shown in FIG. 3A, the user at the customer 300 uses the input device 316 to choose a plurality of structural features 114 of the configured connector 30. The available structural features 114 for each product type 113 are stored in the configurator module 110, as shown in FIG. 2. During the display updating process 600 to present the new interface data 314 corresponding to the step 508, the configuration processor 102 sends the interface data 314 to the customer 300 that displays the structural features 114 selectable for the product type 113 chosen in step 504. In the embodiment shown in FIGS. 6 and 7, for example, the interface data 314 shows an image 314c that is a three dimensional model of the configured connector 30 as a low voltage type 113a and structural features 114 corresponding to the low voltage type 113a. In the embodiment shown in FIG. 8, for example, the interface data 314 shows an image 314c of the configured connector 30 as a high voltage type 113b and structural features 114 corresponding to the high voltage type 113b. In the embodiment shown in FIG. 9, for example, the interface data 314 shows an image 314c of the configured connector 30 as a data type 113c and structural features 114 corresponding to the data type 113c.

The structural features 114, as shown in FIGS. 6-9, are presented as a plurality of tabs 314d of the interface data 314 on the display 312. In another embodiment, the structural features 114 could be presented as any other type of element of the interface data 314 that allows the selection described herein. The user at the customer 300 uses the input device 316 to select one of the structural features 114 in the step 508 in FIG. 3A, executing the display updating process 600 to present additional elements of the interface data 314 related to the selected structural feature 114 for further selection by the user. In the embodiment of the configured connector 30 as the low voltage type 113a shown in FIGS. 6 and 7, for example, the structural features 114 available for selection include, among other options, a style of the configured connector 30, whether the connector 30 is sealable, a number of positions of the connector 30, and a number of rows of the connector 30. The list of structural features 114 described herein and shown in the embodiments of FIGS. 6-9 is merely exemplary; any other structural features 114 related to any type of connector 30 can be selected as described herein.

Figure 6:
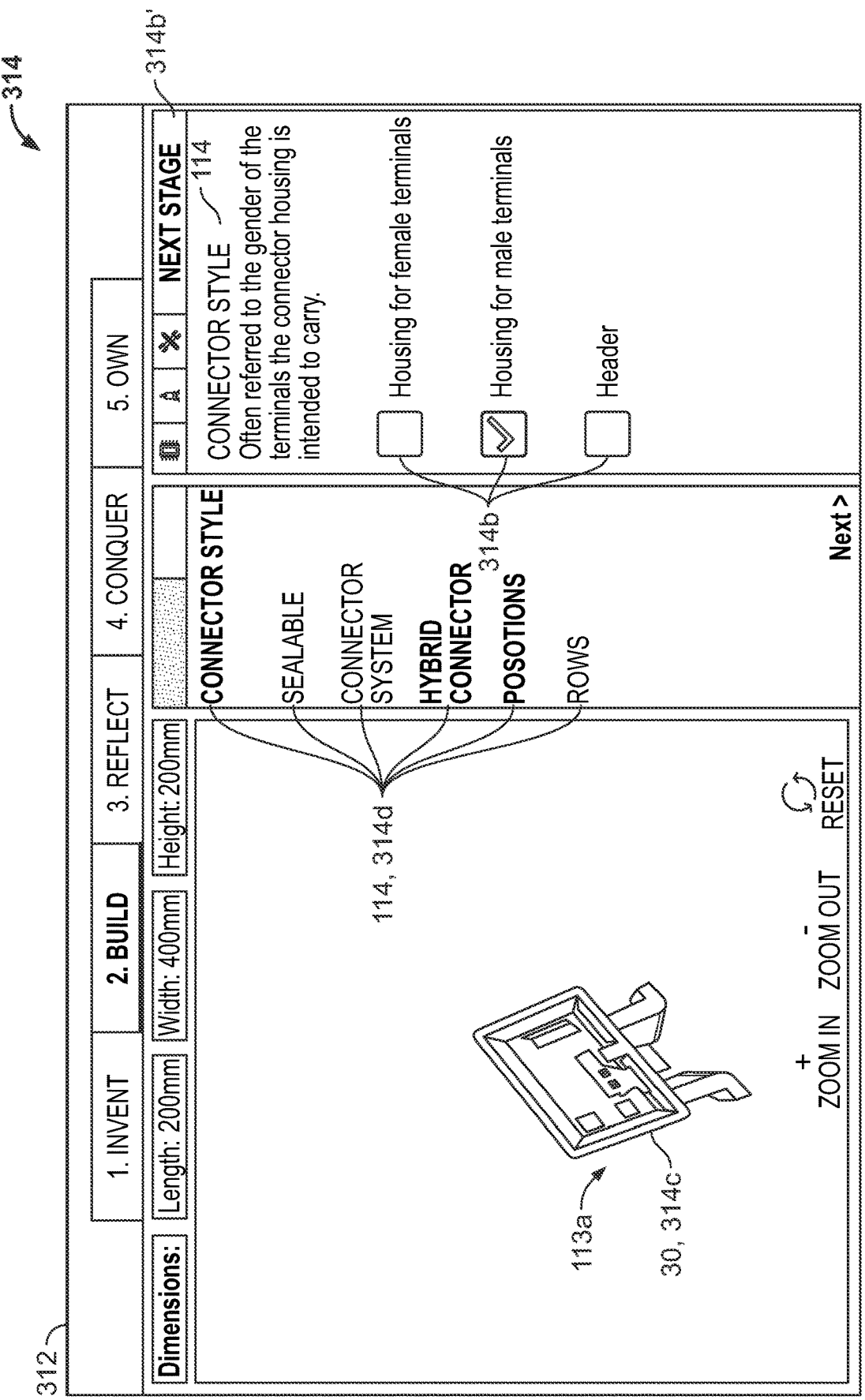
FIG. 6 is another schematic diagram of a plurality of interface data in a step of the configuration process.
Figure 7:
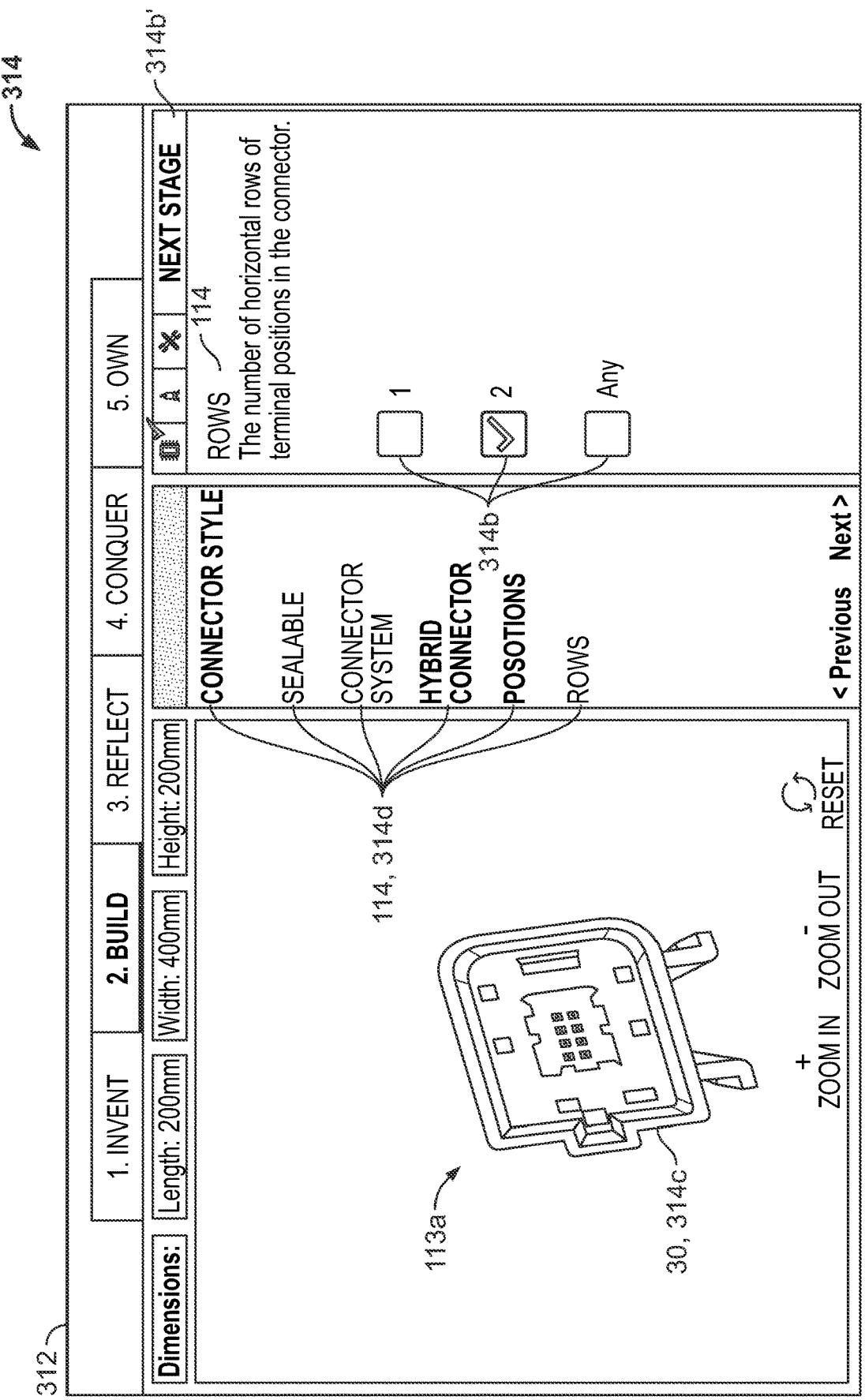
FIG. 7 is another schematic diagram of a plurality of interface data in a step of the configuration process.

FIG. 6 shows, for example, the additional elements of the interface data 314 available on the display 312 when the user selects the structural feature 114 of the style of the configured connector 30. The additional elements are presented as buttons 314b of the interface data 314 in the shown embodiment and allow the user to select a housing for female terminals, a housing for male terminals, or a header as the style of the connector 30. FIG. 7 shows, for example, the additional elements of the interface data 314 available when the user selects the structural feature 114 of the number of rows of the connector 30. The additional elements are presented as buttons 314b of the interface data 314 in the shown embodiment and allow the user to select a one row connector 30, a two row connector 30, or any number of rows of the connector 30. The additional elements for selection corresponding to each structural feature 114 can be presented similarly and can be by any type of element of the interface data 314 allowing selection with the input device 316, such as a field 314a, a button 314b, an image 314c, a tab 314d, a slider 314e, or any other type of element of the interface data 314.

As shown in FIGS. 6 and 7, when the structural features 114 and the corresponding additional elements of the interface data 314 are selected with the input device 316 in the step 508 of FIG. 3A, the display updating process 600 is executed to update the image 314c of the interface data 314 to show the configured connector 30 with the selected structural features 114. FIG. 6, for example, shows the selection of a housing for male terminals in the image 314c and FIG. 7, for example, shows the selection of two rows of terminal positions in the image 314c. In the shown embodiment, the image 314c is a three dimensional model on the display 120 that is capable of being manipulated by being rotated and otherwise changed in orientation via the input device 316.

Figure 8:
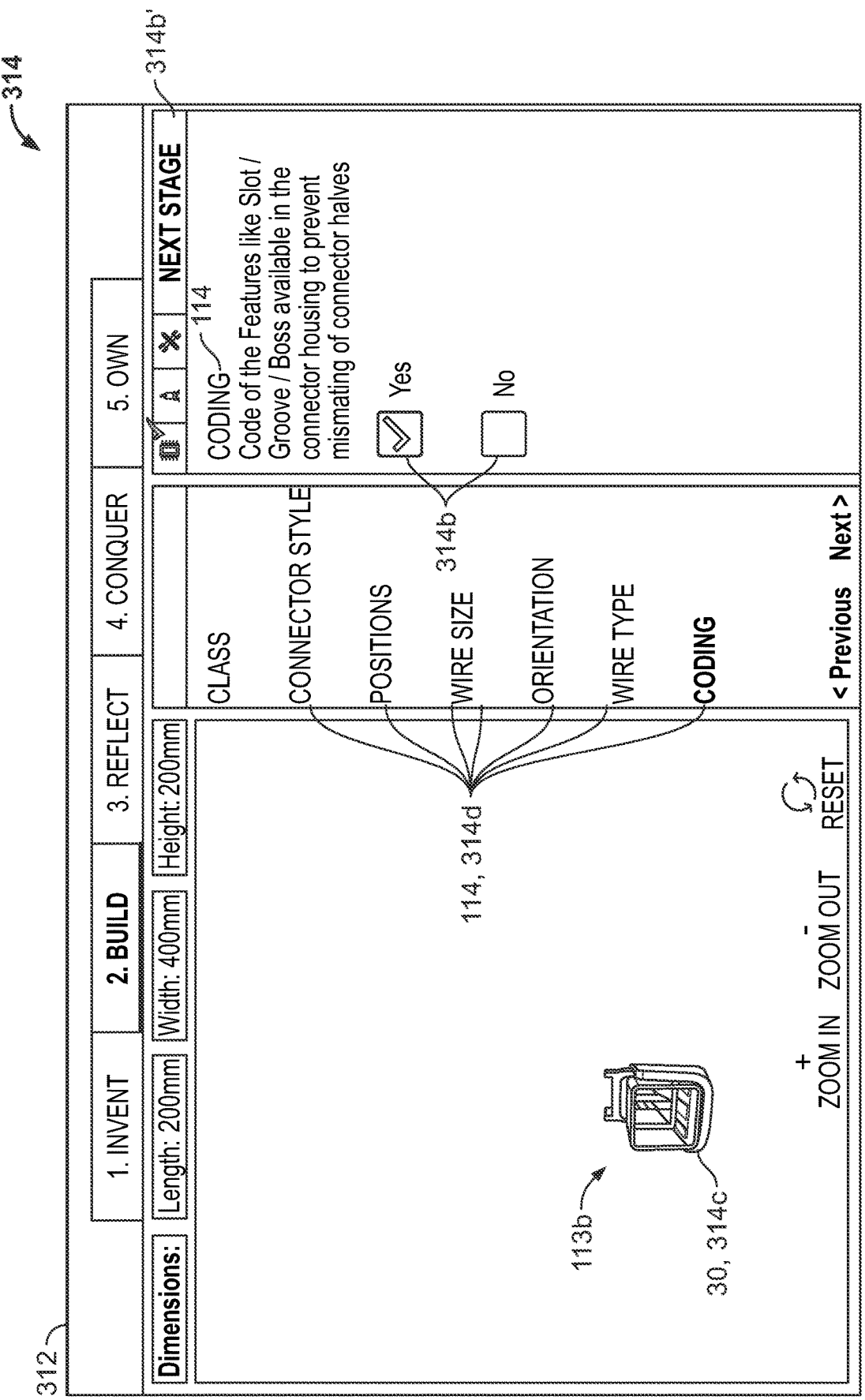
FIG. 8 is another schematic diagram of a plurality of interface data in a step of the configuration process.

In the embodiment of the configured connector 30 as the high voltage type 113b shown in FIG. 8, for example, the structural features 114 available for selection include, among other possible options, a class of the configured connector 30, a style of the configured connector 30, a number of positions of the connector 30, a wire size usable with the connector 30, and a coding of the connector 30. FIG. 8 shows, for example, the additional elements of the interface data 314 available on the display 312 when the user selects the structural feature 114 of the coding of the configured connector 30. The additional elements are presented as buttons 314b of the interface data 314 in the shown embodiment and allow the user to select whether the connector 30 has a coding to prevent misalignment with a mating connector. FIG. 8 also shows, for example, the image 314c updated to show the configured connector 30 with the selected structural feature 114 of the coding.

Figure 9:
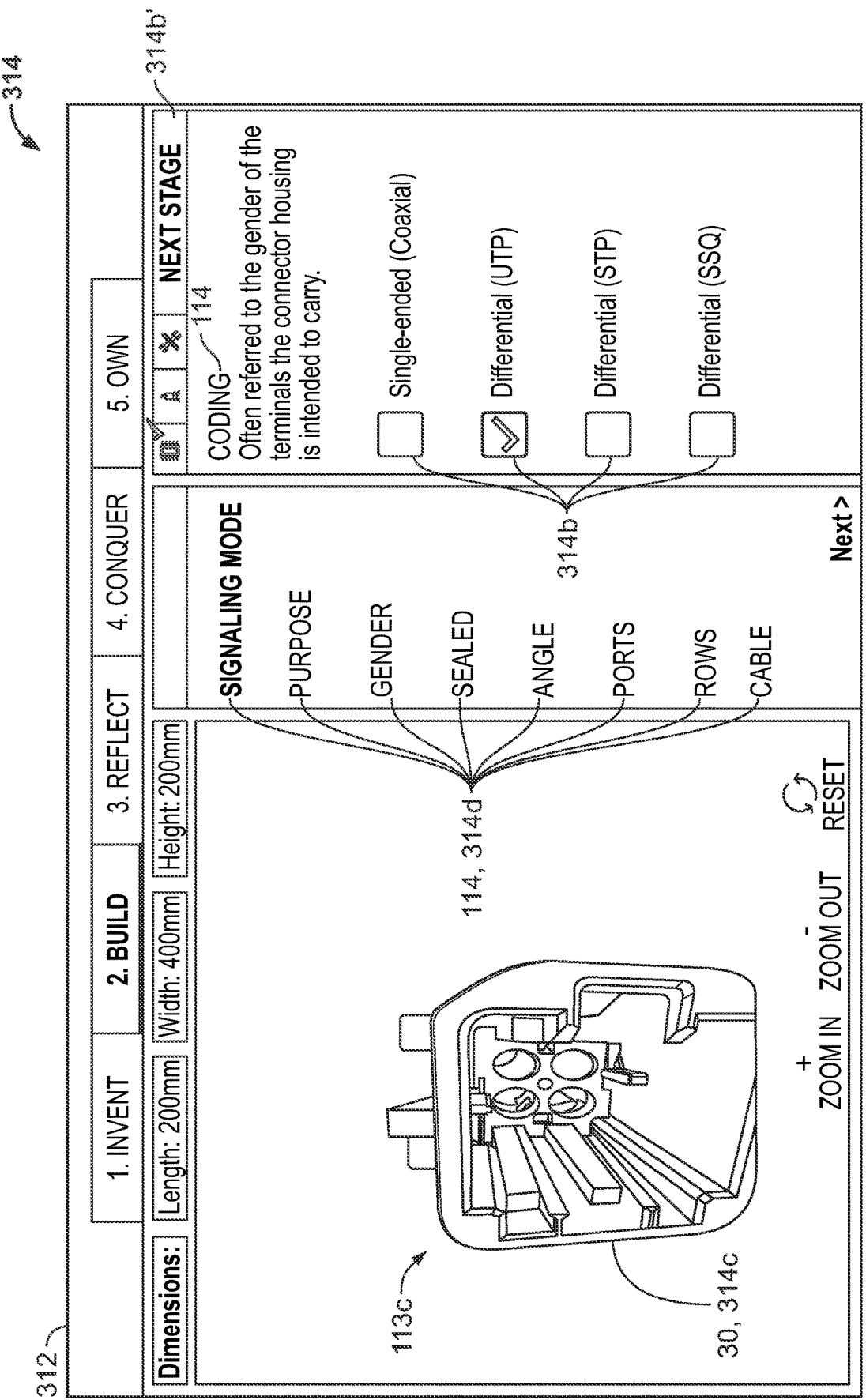
FIG. 9 is another schematic diagram of a plurality of interface data in a step of the configuration process.

In the embodiment of the configured connector 30 as the data type 113c shown in FIG. 9, for example, the structural features 114 available for selection include, among other possible options, a signaling mode of the configured connector 30, a gender of the connector 30, whether the connector 30 is sealed, an angle of the connector 30, and a number of rows of the connector 30. FIG. 9 shows, for example, the additional elements of the interface data 314 available on the display 312 when the user selects the structural feature 114 of the signaling mode of the configured connector 30. The additional elements are presented as buttons 314b of the interface data 314 in the shown embodiment and allow the user to select a single-ended or various types of differential signal modes of the connector 30. FIG. 9 also shows the image 314c updated to show the configured connector 30 with the selected structural feature 114 of the signaling mode.

In the step 508 of the configuration process 500 shown in FIG. 3A, the user at the customer can select a plurality of different types of structural features 114 of the configured connector 30 for a plurality of different product types 113 using the interface data 314 and the display updating process 600. The embodiments described above and shown in FIGS. 6-9 are merely exemplary; other structural features 114 with other options for selection may be available for any of the product types 113. Upon selection of each of the necessary structural features 114 in the step 508, the user at the customer 300 selects an element of the interface data 314, a button 314b' in the embodiment of FIGS. 6-9, that indicates completed selection of the structural features 114. The display updating process 600 at step 508 stores the selected structural features 114 for the customer ID 308 in the customer configurations 150, as shown in FIG. 2, and presents new interface data 314 on the display 312 shown, for example, in FIG. 10.

In a step 510 shown in FIG. 3A, the user at the customer 300 uses the input device 316 to choose a plurality of performance requirements 115 of the configured connector 30. The available performance requirements 115 for each product type 113 are stored in the configurator module 110, as shown in FIG. 2. During the display updating process 600 to present the new interface data 314 corresponding to the step 510, the configuration processor 102 sends the interface data 314 to the customer 300 that displays the performance requirements 115 selectable for the product type 113 chosen in step 504.

Figure 10:
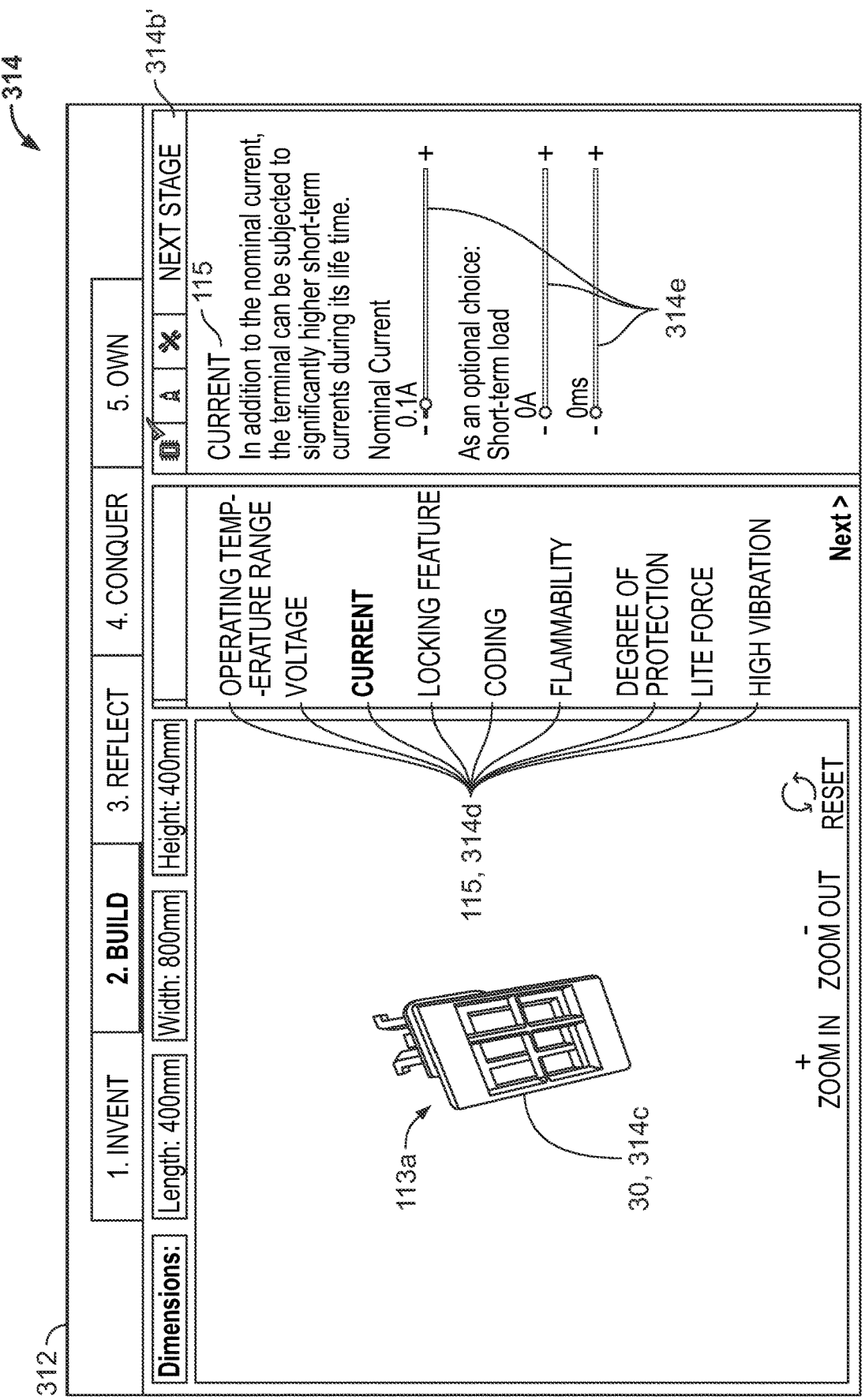
FIG. 10 is another schematic diagram of a plurality of interface data in a step of the configuration process.

In the embodiment shown in FIG. 10, for example, the interface data 314 shows an image 314c that is a three dimensional model of the configured connector 30 as a low voltage type 113a and performance requirements 115 corresponding to the low voltage type 113a. The performance requirements 115 are presented as a plurality of tabs 314d in the shown embodiment, but could be presented as any other type of element of the interface data 314 that allows the selection described herein. In the embodiment shown in FIG. 10, the performance requirements 115 available for selection include, among other options, an operating temperature range of the connector 30, a current used with the connector 30, flammability requirements of the connector 30, and vibration requirements of the connector 30.

Similarly to the selection of the structural features 114 in step 508, the user at the customer 300 uses the input device 316 to select one of the performance requirements 115 in the step 510 in FIG. 3A, executing the display updating process 600 to present additional elements of the interface data 314 related to the selected performance requirement 115 for further selection by the user. FIG. 10 shows, for example, the additional elements of the interface data 314 available on the display 312 when the user selects the performance requirement 115 of the current of the configured connector 30. The additional elements are presented as a plurality of sliders 314e of the interface data 314 in the shown embodiment and allow the user to select a nominal current for the connector 30 and optionally a higher short-term current during the life time of the connector 30. When the performance requirement 115 and the corresponding additional elements of the interface data 314 are selected with the input device 316, the display updating process 600 may be executed to update the image 314c of the interface data 314 to show the configured connector 30 with the selected performance requirement 115, if the performance requirement 115 is related to a change apparent in the image 314c.

In the step 510 of the configuration process 500 shown in FIG. 3A, the user at the customer 300 can select a plurality of different types of performance requirements 115 of the configured connector 30 for a plurality of different product types 113 using the interface data 314 and the display updating process 600. The embodiment described above and shown in FIG. 10 is merely exemplary; other performance requirements 115 with other options for selection presented as any type of element of interface data 314 may be available for any of the product types 113. Upon selection of each of the necessary performance requirements 115 in the step 510, the user at the customer 300 selects an element of the interface data 314, a button 314b' in the embodiment of FIG. 10, that indicates completed selection of the performance requirements 115. The display updating process 600 at step 510 stores the selected performance requirements 115 for the customer ID 308 in the customer configurations 150, as shown in FIG. 2, and presents new interface data 314 on the display 312 shown, for example, in FIG. 11.

In a step 512 shown in FIG. 3A, the user at the customer 300 uses the input device 316 to choose a plurality of personalization options 116 of the configured connector 30. The available personalization options 116 for each product type 113 are stored in the configurator module 110, as shown in FIG. 2. In an embodiment, the personalization options 116 are the same for each product type 113. In another embodiment, the personalization options 116 are different for each product type 113. During the display updating process 600 to present the new interface data 314 corresponding to the step 512, the configuration processor 102 sends the interface data 314 to the customer 300 that displays the personalization options 116 selectable for the product type 113 chosen in step 504.

Figure 11:
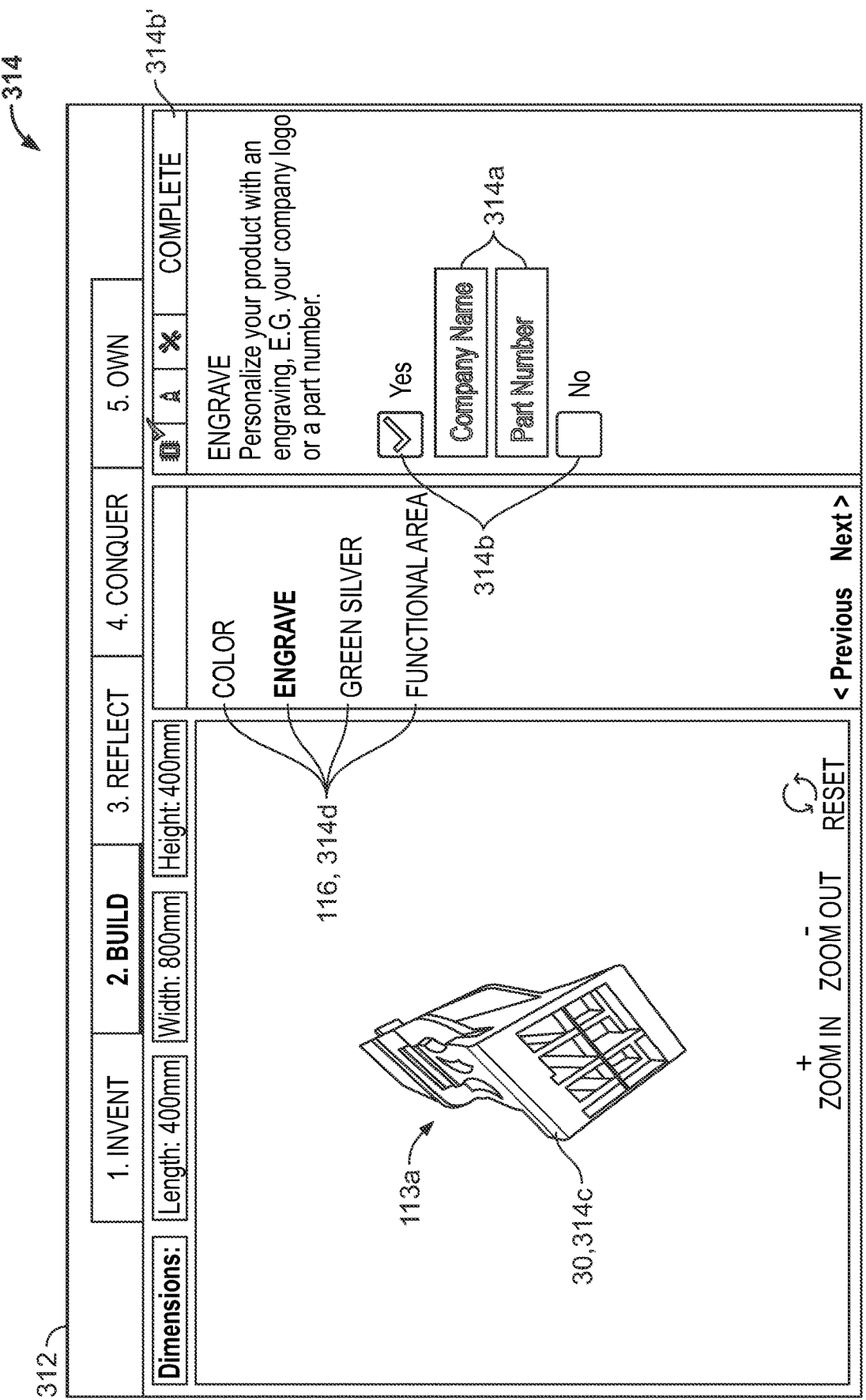
FIG. 11 is another schematic diagram of a plurality of interface data in a step of the configuration process.

In the embodiment shown in FIG. 11, for example, the interface data 314 shows an image 314c that is a three dimensional model of the configured connector 30 as a low voltage type 113a and personalization options 116 corresponding to the low voltage type 113a. The personalization options 116 are presented as a plurality of tabs 314d in the shown embodiment, but could be presented as any other type of element of the interface data 314 that allows the selection described herein. In the embodiment shown in FIG. 11, the personalization options 116 available for selection include, among other options, a color of the connector 30 and an engraving on the connector 30.

Similarly to the selection of the structural features 114 in step 508 and the selection of the performance requirements 115 in step 510, the user at the customer 300 uses the input device 316 to select one of the personalization options 116 in the step 512 in FIG. 3A, executing the display updating process 600 to present additional elements of the interface data 314 related to the selected personalization option 116 for further selection by the user. FIG. 11 shows, for example, the additional elements of the interface data 314 available on the display 312 when the user selects the personalization option 116 of the engraving on the configured connector 30. The additional elements are presented as a pair of buttons 314b and a pair of fields 314a of the interface data 314 in the shown embodiment and allow the user to select whether and what to engrave on the connector 30. When the personalization options 116 and the corresponding additional elements of the interface data 314 are selected with the input device 316, the display updating process 600 may be executed to update the image 314c of the interface data 314 to show the configured connector 30 with the selected personalization option 116, if the personalization option 116 is related to a change apparent in the image 314c.

In the step 512 of the configuration process 500 shown in FIG. 3A, the user at the customer 300 can select a plurality of different types of personalization options 116 of the configured connector 30 for a plurality of different product types 113 using the interface data 314 and the display updating process 600. The embodiment described above and shown in FIG. 11 is merely exemplary; other personalization options 116 with other options for selection presented as any type of element of interface data 314 may be available for any of the product types 113. Upon selection of each of the necessary personalization options 116 in the step 512, the user at the customer 300 selects an element of the interface data 314, a button 314b′ in the embodiment of FIG. 11, that indicates completed selection of the personalization options 116. The display updating process 600 at step 512 stores the selected personalization options 116 for the customer ID 308 in the customer configurations 150, as shown in FIG. 2, and presents new interface data 314 on the display 312 shown, for example, in FIG. 12.

Figure 12:
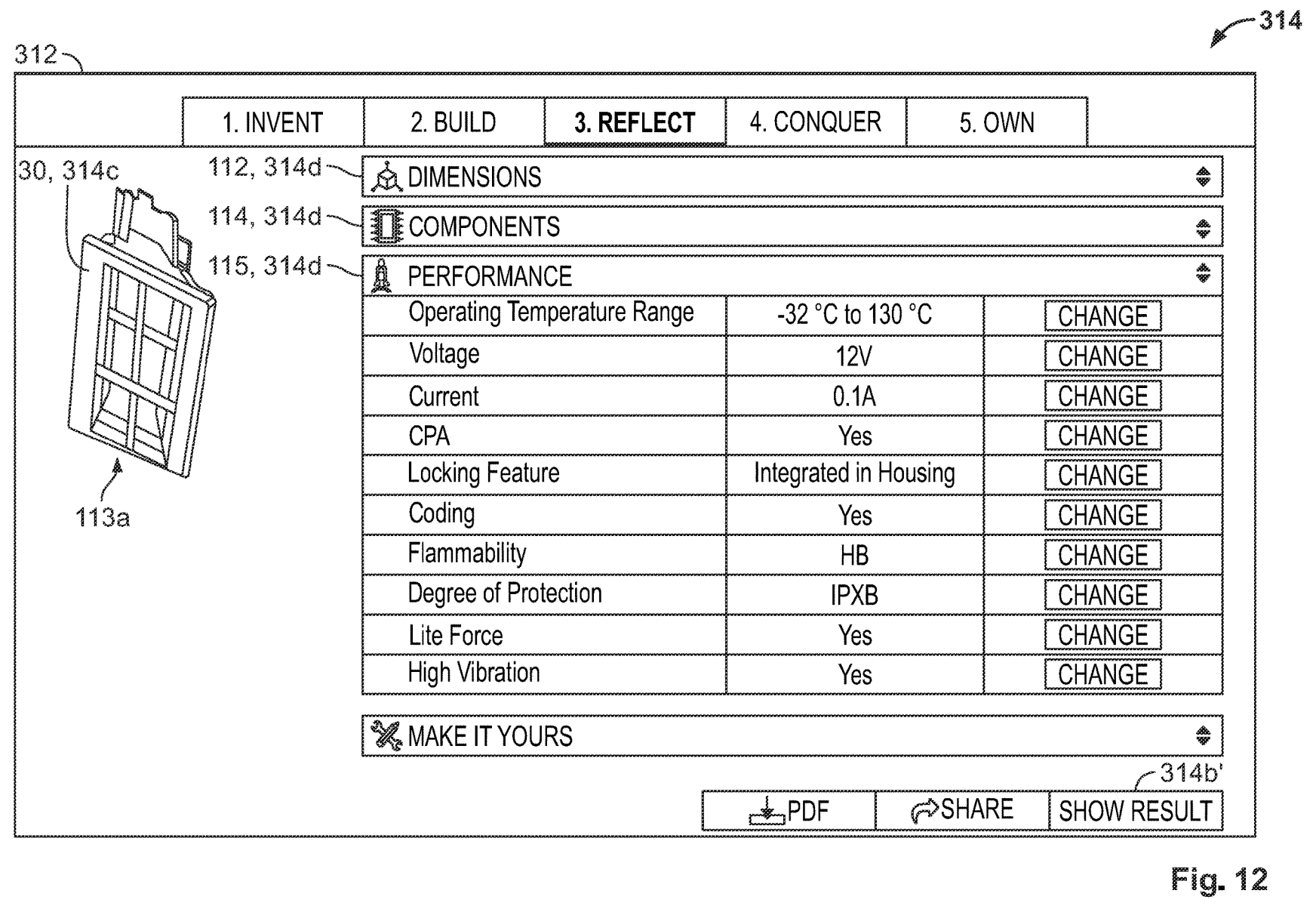

In the configuration process 500 shown in FIG. 3A, following the selection of the product type 113 in step 504, the selection of outer dimensions 112 in step 506, the selection of structural features 114 in step 508, the selection of performance requirements 115 in step 510, and the selection of personalization options 116 in step 512, the connector configuration system 100 presents a summary of the selections in steps 504-512 to the customer 300 in a step 514. The execution of the display updating process 600 results, for example, in the interface data 314 representing a summary of the selections on the display 312 as shown in FIG. 12. The interface data 314 in the step 514 can include the image 314c of the configured connector 30 and tabs 314b relating to each of the selected outer dimensions 112, structural features 114, performance requirements 115, and personalization options 116. In other embodiments, the summary of the selections of the outer dimensions 112, structural features 114, performance requirements 115, and personalization options 116 can be presented in elements of the interface data 314 other than tabs 314d. When the user at the customer 300 has completed review of the presented summary in step 514, the user selects an element of the interface data 314, a button 314b′ in the embodiment of FIG. 11, that indicates completed review. The display updating process 600 at step 514 then presents new interface data 314 on the display 312 shown, for example, in FIG. 13.

Figure 3B:
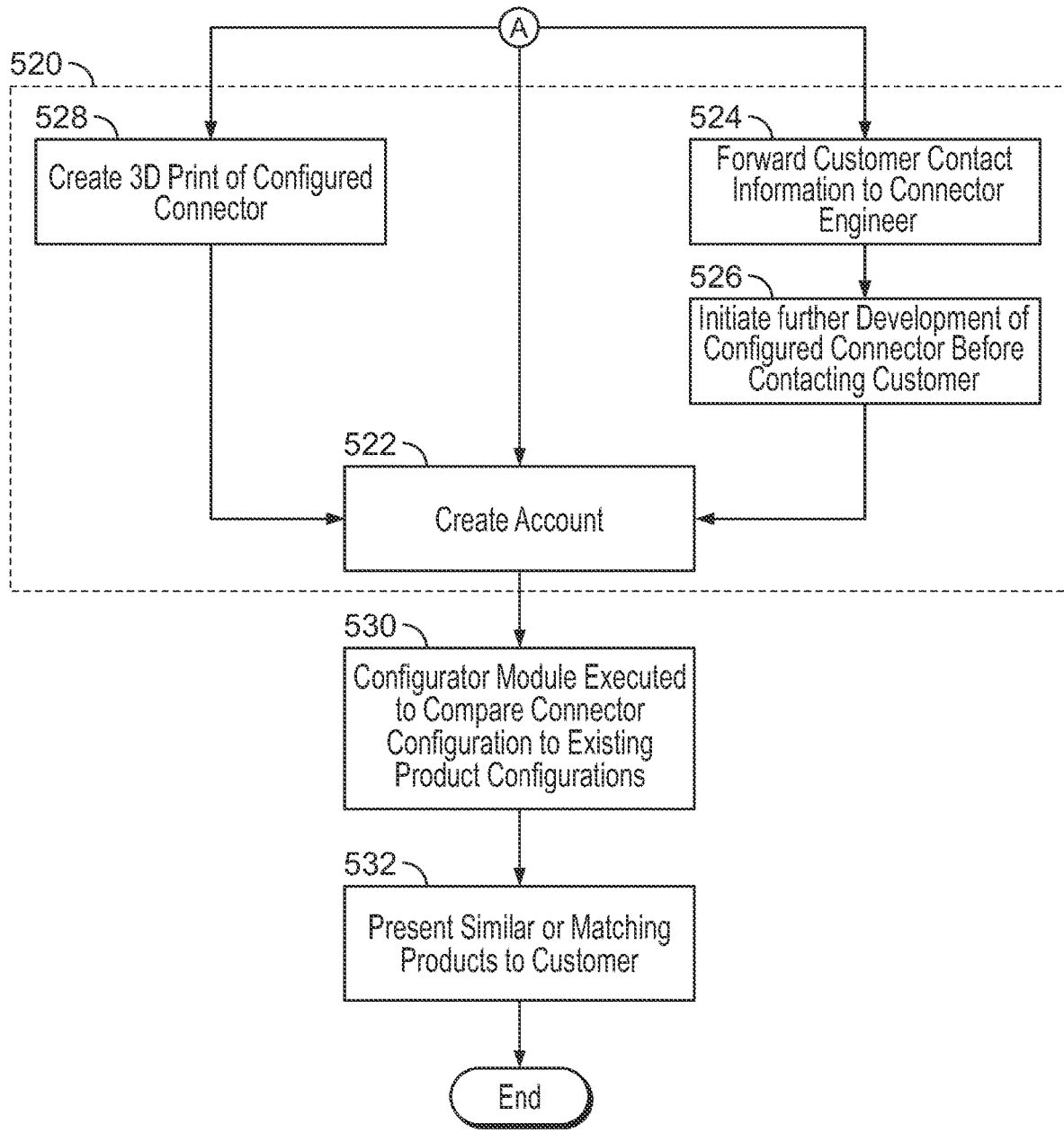
FIG. 3B is a continuation of the flowchart of FIG. 3A.
Figure 13:
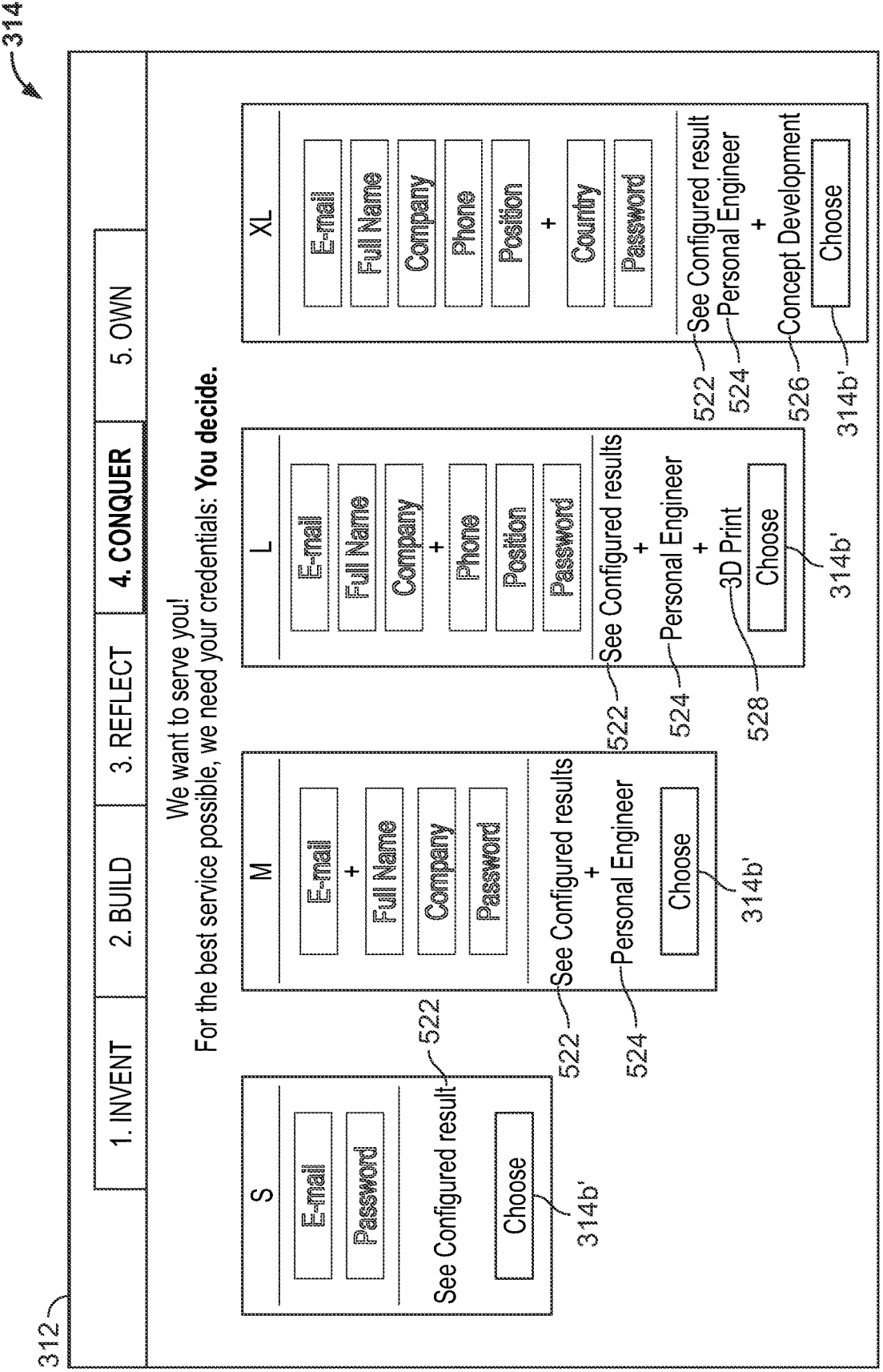
FIG. 13 is another schematic diagram of a plurality of interface data in a step of the configuration process.

Following the summary in step 514, the configuration process 500 proceeds to an execution portion 520 of the process 500 shown in FIG. 3B. The configuration processor 102 executes a plurality of execution options 118 stored in the configurator module 110, as shown in FIG. 2, to implement the execution portion 520. In the execution portion 520, the customer 300 has a number of options for proceeding with the configured connector 30 that are presented in interface data 314 on the display 312. As shown in FIGS. 3B and 13, the user at the customer 300 can simply create an account 522 with the connector configuration system 100 if one does not already exist; this account retains the information stored in the customer configurations 150 for later retrieval.

In another option of the execution portion 520 shown in FIGS. 3B and 13, the user at the customer 300 can enter contact information to be forwarded 524 to a connector engineer of the manufacturer 200; in this option, the connector engineer of the manufacturer 200 will contact the customer 300 for further development of the configured connector 30. In another embodiment, in addition to the contact information of the customer 300 forwarded 524 to the connector engineer, the customer 300 can initiate further development 526 of the configured connector 30 by the connector engineer before the connector engineer contacts the customer 300.

In another embodiment shown in FIGS. 3B and 13, the user at the customer 300 can order the creation of a 3D print 528 of the configured connector 30. In this option, the configuration processor 102 sends the customer configuration 150 to the manufacturer 200, and the manufacturer processor 202 controls the additive manufacturing device 220 to produce a physical version of the configured connector 30.

Each of the optional steps 524, 526, 528 of the execution portion 520 shown in FIGS. 3B and 13 can be combined with the creation of an account 522 with the connector configuration system 100 if one does not already exist. In other embodiments, any of the steps 522, 524, 526, 528 of the execution portion 520 can be used singularly or combined in any combination, and is not limited to the combinations shown in the embodiment of the interface data 314 of FIG. 13.

When the user at the customer 300 has selected the desired option or options of the execution portion 520 via the interface data 314, the selection of a corresponding button 314b′ shown in FIG. 13 with the input device 316 ends the execution portion 520 of the configuration process 500 and initiates the display updating process 600 for the execution portion 520. At the end of the execution portion 520, the configuration processor 102 also transmits the customer configuration 150 corresponding to the configured connector 30 to the manufacturer 200. The manufacturer processor 202 stores the customer configuration 150 in the configuration database 210, as shown in FIG. 1, along with the data for all other configurations created with the connector configuration system 100.

In a step 530 of the configuration process 500 shown in FIG. 3B following the execution portion 520, the configuration processor 102 executes the configurator module 110 to compare the configured connector 30 to the existing product configurations 212 of the manufacturer 200. The configuration processor 102 retrieves the existing product configurations 212 and compares the configured connector 30 to the existing product configurations 212 by, for example, comparing the outer dimensions 112, the product type 113, the structural features 114, the performance requirements 115, and the personalization options 116 data stored in the customer configurations 150 to the same elements of the existing product configurations 212. Based on this comparison, the configuration processor 102 determines whether any of the existing product configurations 212 are similar to, for example by a threshold number of similar elements, or match the configured connector 30 created by the customer 30.

Figure 14:
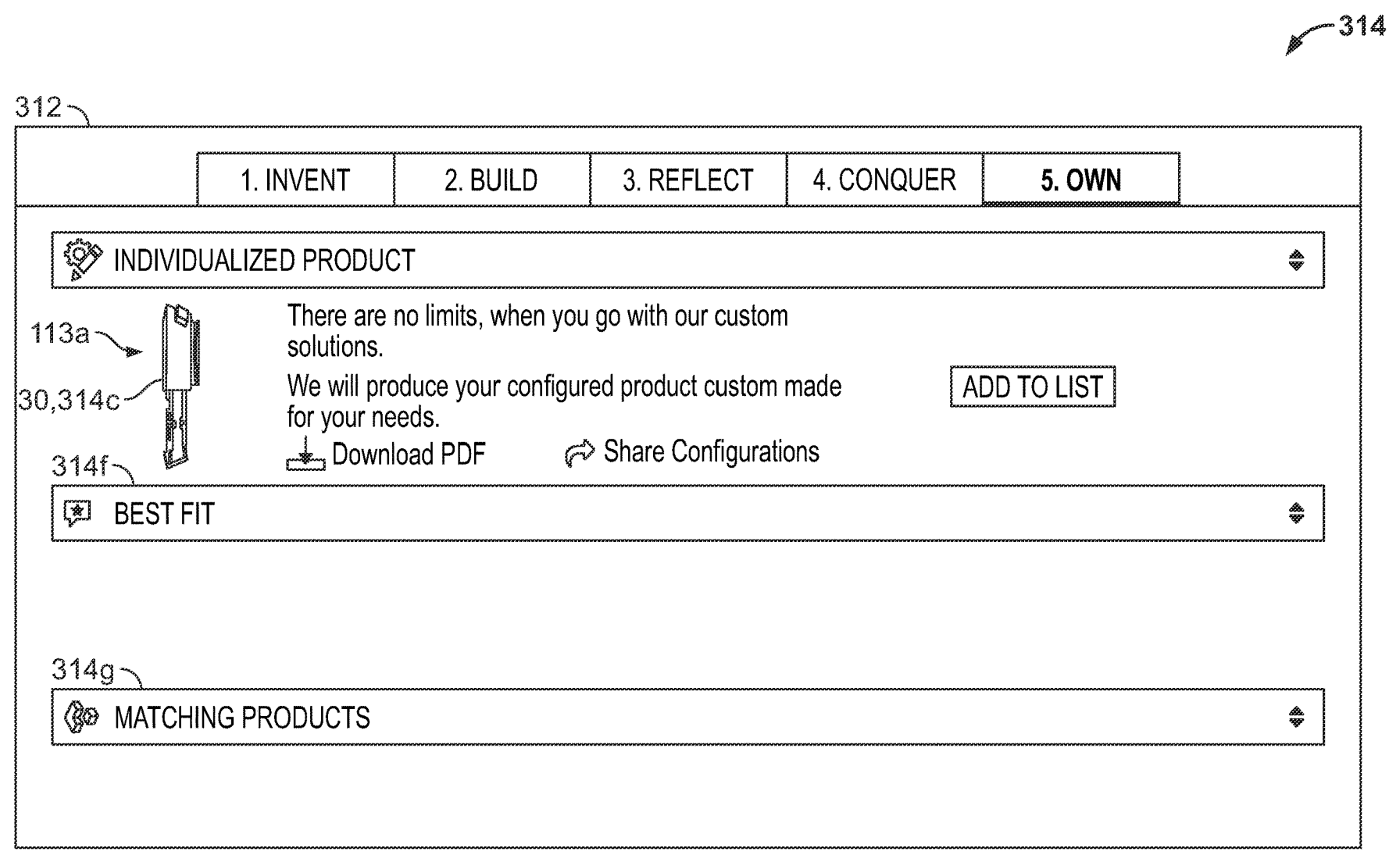

In a step 532 shown in FIG. 3B, the configuration processor 102 transmits interface data 314 representing the similar or matching existing product configurations 212 to the customer 300 for presentation on the display 312. As shown in FIG. 14, the interface data 314 in the step 532 can present the image 314c of the configured connector 30 along with a similar existing product section 314*f* presenting any similar existing product configurations 212 and a matching product section 314*g* presenting any matching existing product configurations 212. Based on this information, the user at the customer 300 can determine whether to proceed with the configured connector 30, and await the result of the execution process 520, or whether to pursue more information on one of the existing product configurations 212.

Figure 15:
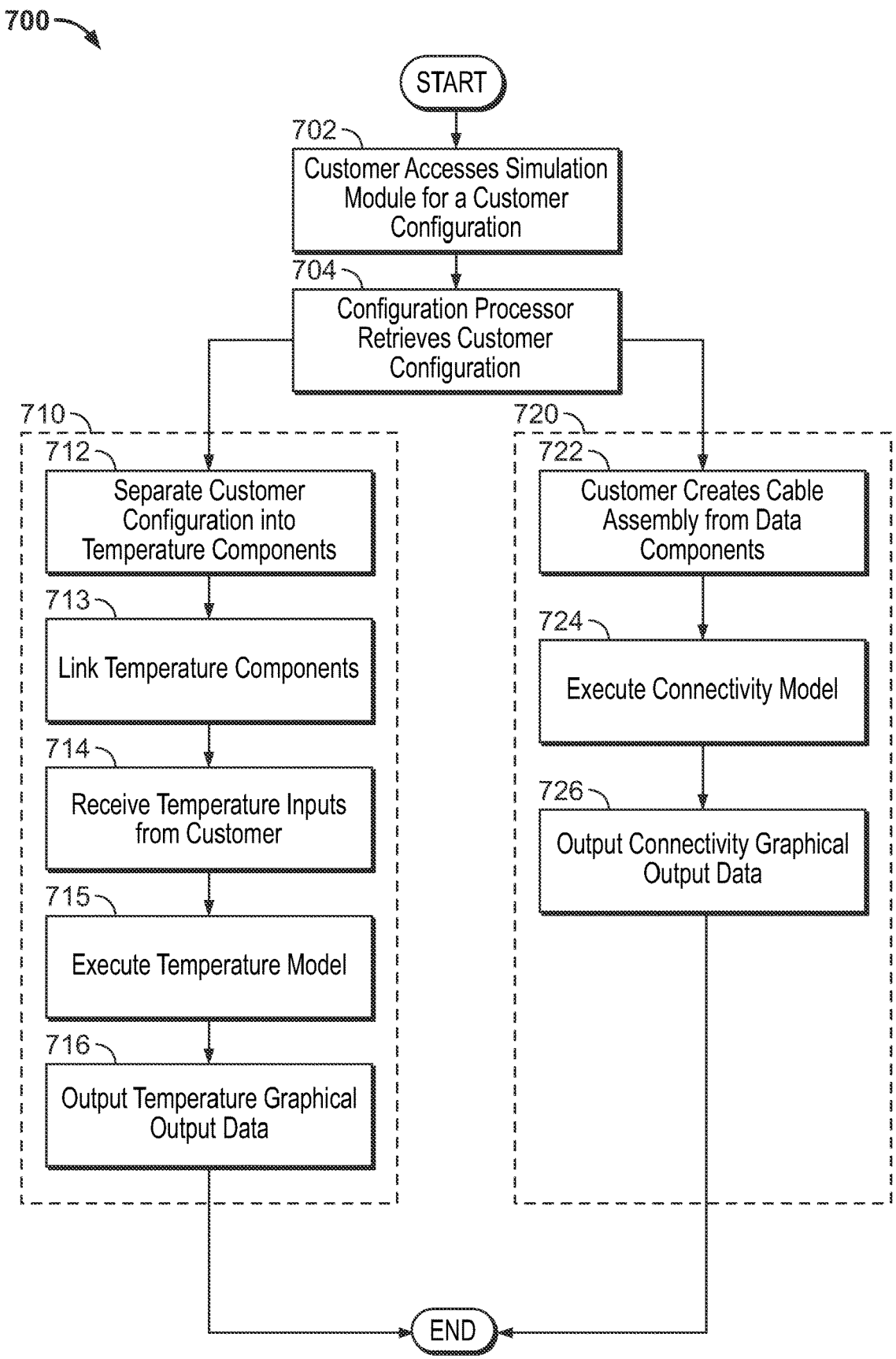
FIG. 15 is a flowchart of a simulation process of the connector configurator.

A simulation process 700 according to an embodiment is shown in FIG. 15. The configurator processor 102 executes the simulation module 120 stored on the configuration memory 106 in order to implement the simulation process 700. The simulation process 700 follows the configuration of the configured connector 30 in the configuration process 500 and, as described in detail below, simulates usage qualities of the configured connector 30.

In a step 702 of the simulation process 700 shown in FIG. 15, the customer 300 accesses the simulation module 120 of the connector configuration system 110 with a request pertaining to a particular configured connector 30 of the customer 300 stored in the customer configurations 150. Based on the request from the customer 300, the configuration processor 102 in a step 704 retrieves the configured connector 30 from the customer configurations 150 and executes the simulation module 120 stored on the configuration memory 106 for the chosen configured connector 30 of the customer configurations 150.

Following the step 704, the simulation process 700 continues with either a temperature simulation portion 710, in which the configuration processor 102 executes a temperature simulator 122 stored in the simulation module 120 as shown in FIG. 2, or a data connectivity simulation portion 720, in which the configuration processor 102 executes a data connectivity simulator 130 stored in the simulation module 120 as shown in FIG. 2. In an embodiment, the temperature simulation portion 710 is used for the low voltage type 113*a* or the high voltage type 113*b* of the configured connector 30 and the data connectivity simulation portion 720 is used for the data type 113*c* of the configured connector 30.

In the temperature simulation portion 710, the configuration processor 102 first separates the configured connector 30 of the customer configurations 150 into a plurality of temperature components 124 in a step 712 shown in FIG. 15. The temperature components 124 are stored in the temperature simulator 122, as shown in FIG. 2, and are each modeled data relating to a different element that could be present in the configured connector 30. The temperature components 124 represent conductive elements of the connector 30 and, for example, can include multiple contact springs of the connector 30, contact bodies of the connector 30, crimps or termination of the connector 30, and transfer electrical lines of the connector 30.

Figure 16:
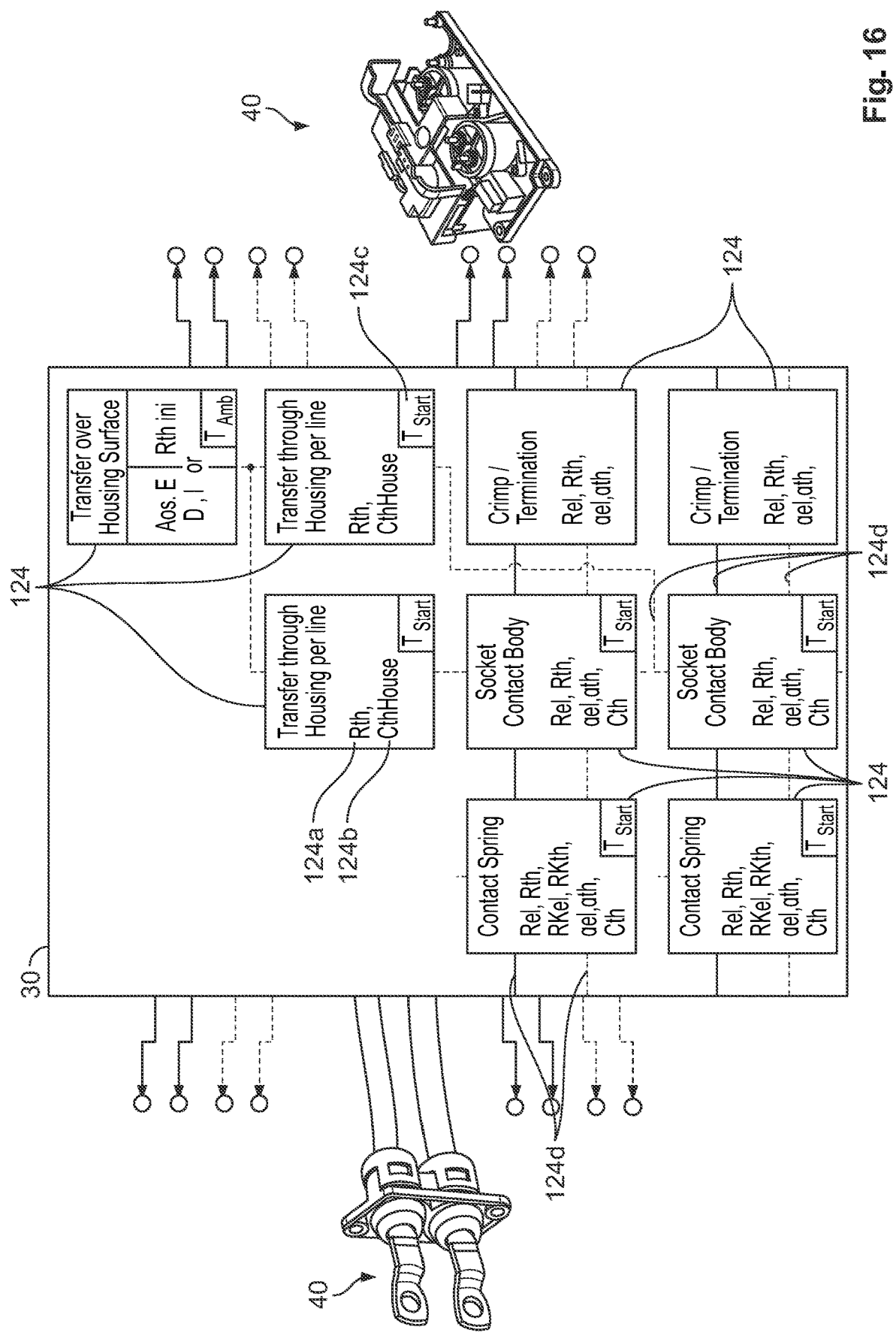
FIG. 16 is a schematic diagram of a plurality of temperature components of a configured connector.

The temperature components 124, stored as modeled data in the temperature simulator 122, are schematically indicated as part of the configured connector 30 in FIG. 16. As shown in FIG. 16, the modeled data relating to each of the temperature components 124 can include a resistance 124*a* of the component 124, a capacitance 124*b* of the component 124, a starting temperature 124*c* of the component 124, and any other qualities of the components 124 that could influence the development of heat during use and the temperature of the configured connector 30.

In a step 713 shown in FIG. 15, the configuration processor 102 links the temperature components 124 that correspond to the elements of the configured connector 30 as they are arranged in the configured connector 30. For example, as shown schematically in FIG. 16, the temperature components 124 are linked by a plurality of connections 124*d* to indicate which of the temperature components 124 are connected to each other and how they are connected within the configured connector 30 in order to most accurately simulate the temperature environment in the connector 30. Only some of the connections 124*d* are labeled in FIG. 16 for clarity of the drawings. As also shown schematically in FIG. 16, the configuration processor 102 can execute the temperature simulator 122 to link the temperature components 124 of the configured connector 30 to models of external connectors 40 in order to more accurately simulate the temperature environment. FIG. 16, as described above, is a schematic indication of the data generated in steps 712 and 713 as part of the temperature simulation portion 710.

Figure 17:
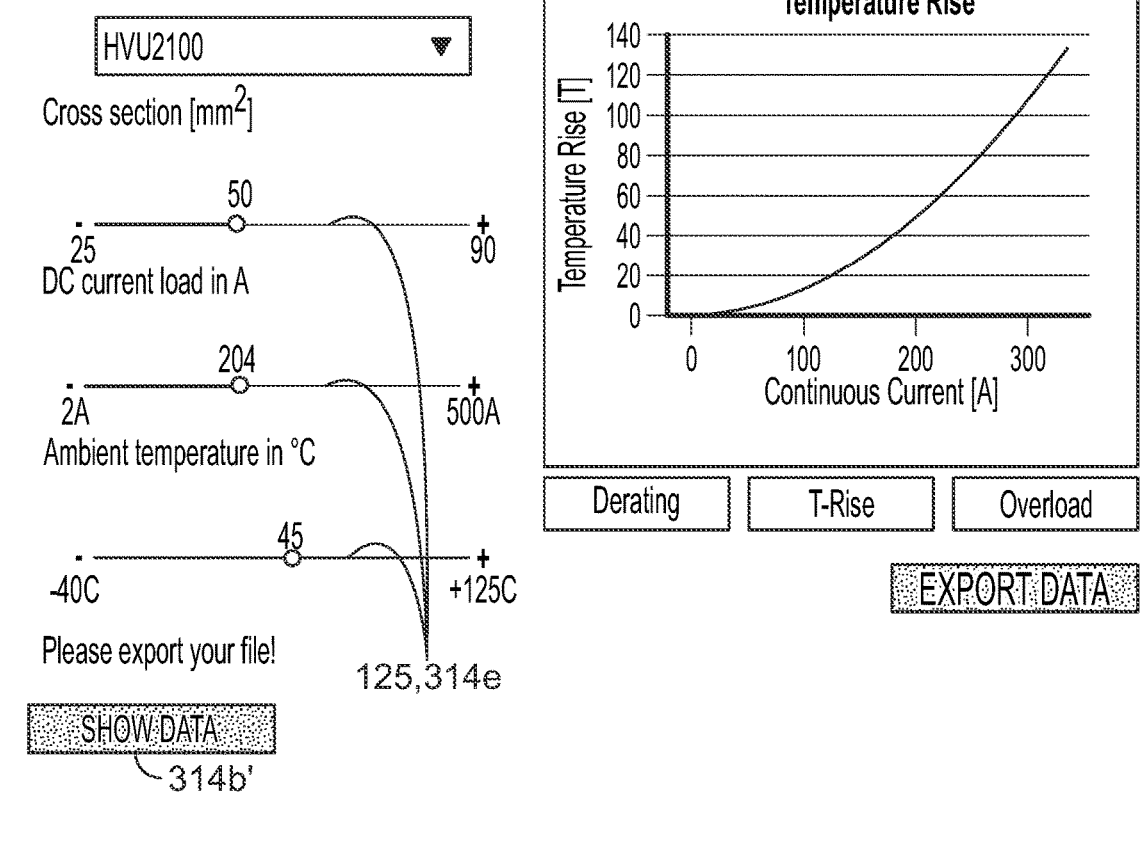
FIG. 17 is a schematic diagram of a plurality of interface data in a step of the simulation process.

In a step 714 shown in FIG. 15, the configuration processor 102 receives a plurality of temperature inputs 125 from the customer 300. The configuration processor 102 sends interface data 314 to the customer 300 for the display 120 that represents the temperature simulator 122, as shown in FIG. 17. The interface data 314, in the shown embodiment, includes a plurality of sliders 314*e* each corresponding to temperature inputs 125 from the customer 300 that dictate the environment that the customer 300 would like to simulate for the configured connector 30. In the shown embodiment, the temperature inputs 125 include a cross sectional area of a wire used with the connector 30, a DC current load for the connector 30, and an ambient temperature of the application for the connector 30 that the customer 300 intends to simulate. In other embodiments, the temperature inputs 125 could be any type of environmental variables that can influence the temperature of the connector 30 in use and can be represented by any type of interface data 314. The user at the customer 300 uses the input device 316 to manipulate the temperature inputs 125, and the customer processor 302 transmits the temperature inputs 125 to the configuration processor 102.

In a step 715 shown in FIG. 15, upon selection of a button 314*b'* of the interface data 314 shown in FIG. 17, the configuration processor 102 executes a temperature model 126. In other embodiments, any element of interface data 314 can be used to execute the temperature model 126 in step 715. The temperature model 126, shown stored in the temperature simulator 122 in FIG. 2, is an algorithm created based on test data of the temperature components 124 when subject to various temperature inputs 125. The temperature model 126 receives the temperature components 124, the connections 124*d*, and the temperature inputs 125 as inputs and, when executed by the configuration processor 102, outputs a predicted temperature of the connector 30 under the input conditions.

In a step 716 shown in FIG. 15, based on the execution of the temperature model 126 in step 715, the configuration processor 102 outputs temperature graphical output data 128 to the customer 300. The temperature graphical output data 128 is stored in the temperature simulator 122, as shown in FIG. 2, and is accessible and configurable by the configuration processor 102 to reflect the output of the temperature model 126. As shown in FIG. 17, the configuration processor 102 sends updated interface data 314 to the customer 300 that shows the temperature graphical output data 128 as an image 314*c*. In the shown embodiment, the temperature graphical output data 128 is a graph of a current vs. a temperature rise of the configured connector 30 under the input conditions. In other embodiments, the temperature graphical output data 128 could be any type of interface element 314 that indicates the results of the temperature model 126 to the customer 300.

Figure 18:
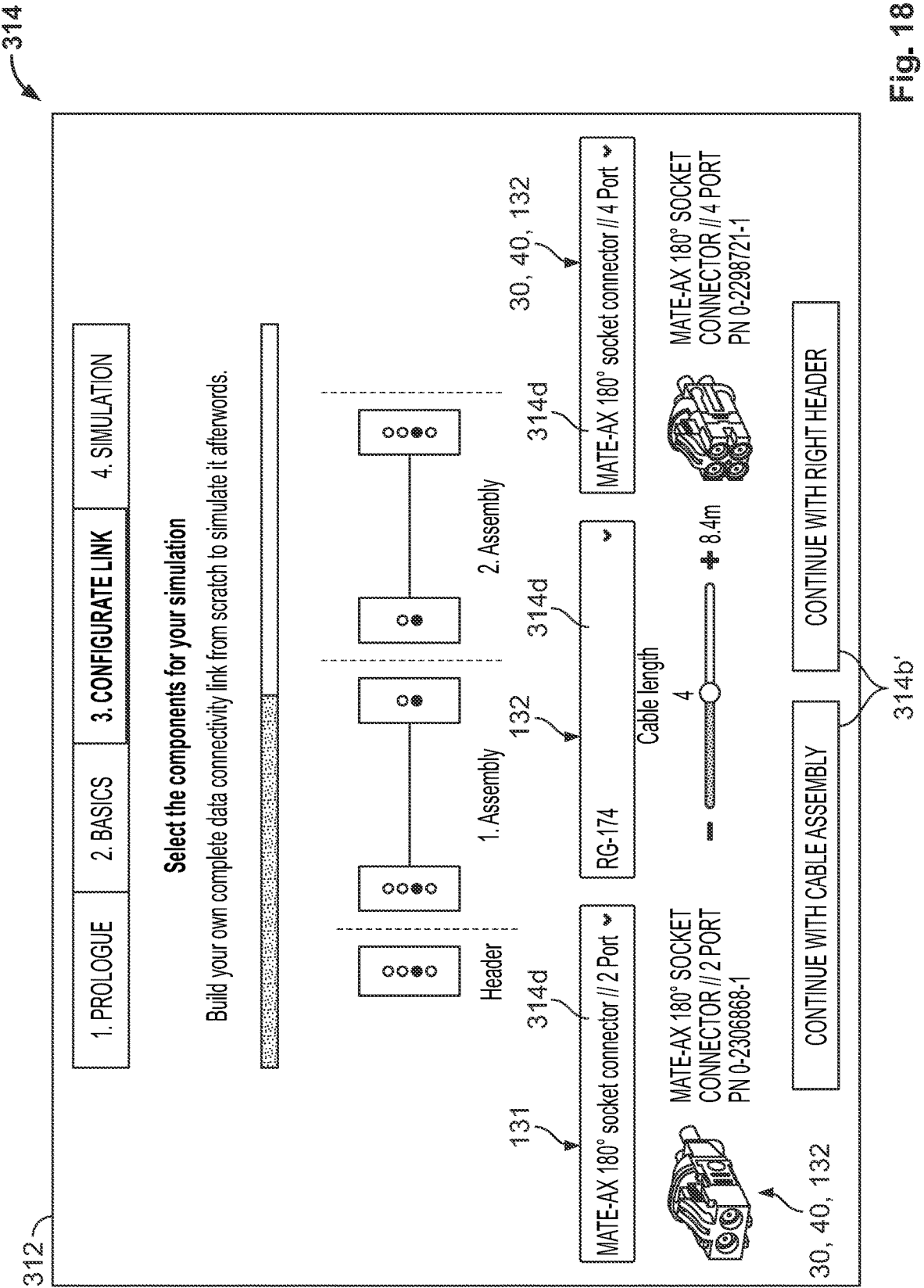
FIG. 18 is another schematic diagram of a plurality of interface data in a step of the simulation process.

In the data connectivity simulation portion 720, shown in FIG. 15, the customer 300 creates a cable assembly 131 from a plurality of data components 132 in a step 722. The configuration processor 102 executes the data connectivity simulator 130 to transmit interface data 314 to the customer 300 representing the data connectivity simulator 130, as shown in FIG. 18. The data components 132 are stored in the data connectivity simulator 130 as shown in FIG. 2. The configuration processor 102 retrieves the data components 132 and transmits the data components 132 as part of the interface data 314. In the embodiment shown in FIG. 18, the data components 132 that can be used to create the cable assembly 131 include the configured connector 30, an external connector 40, or a cable. The user at the customer 300 uses the input device 316 to manipulate the interface elements 314 representing the data components 132 to select the components 132 that comprise the cable assembly 131. In the embodiment shown in FIG. 15, the data components 132 are each a selectable tab 314d of the interface data 314 and, in other embodiments, could be any type of elements of the interface data 314. Upon selection of a button 314b' of the interface data 314 shown in FIG. 18, the customer processor 302 transmits data representing the selected data components 132 of the cable assembly 131 to the connector configuration system 100 in the step 722.

In a step 724 shown in FIG. 15, the configuration processor 102 receives the data representing the cable assembly 131 and executes a connectivity model 134 for the cable assembly 131. The connectivity model 134, shown stored in the data connectivity simulator 130 in FIG. 2, is an algorithm created based on test data of the data components 132 under various conditions and with various other elements in a cable assembly 131. The connectivity model 134 receives the cable assembly 131 as an input and, when executed by the configuration processor 102, outputs a predicted data connectivity performance of the cable assembly 131.

Figure 19:
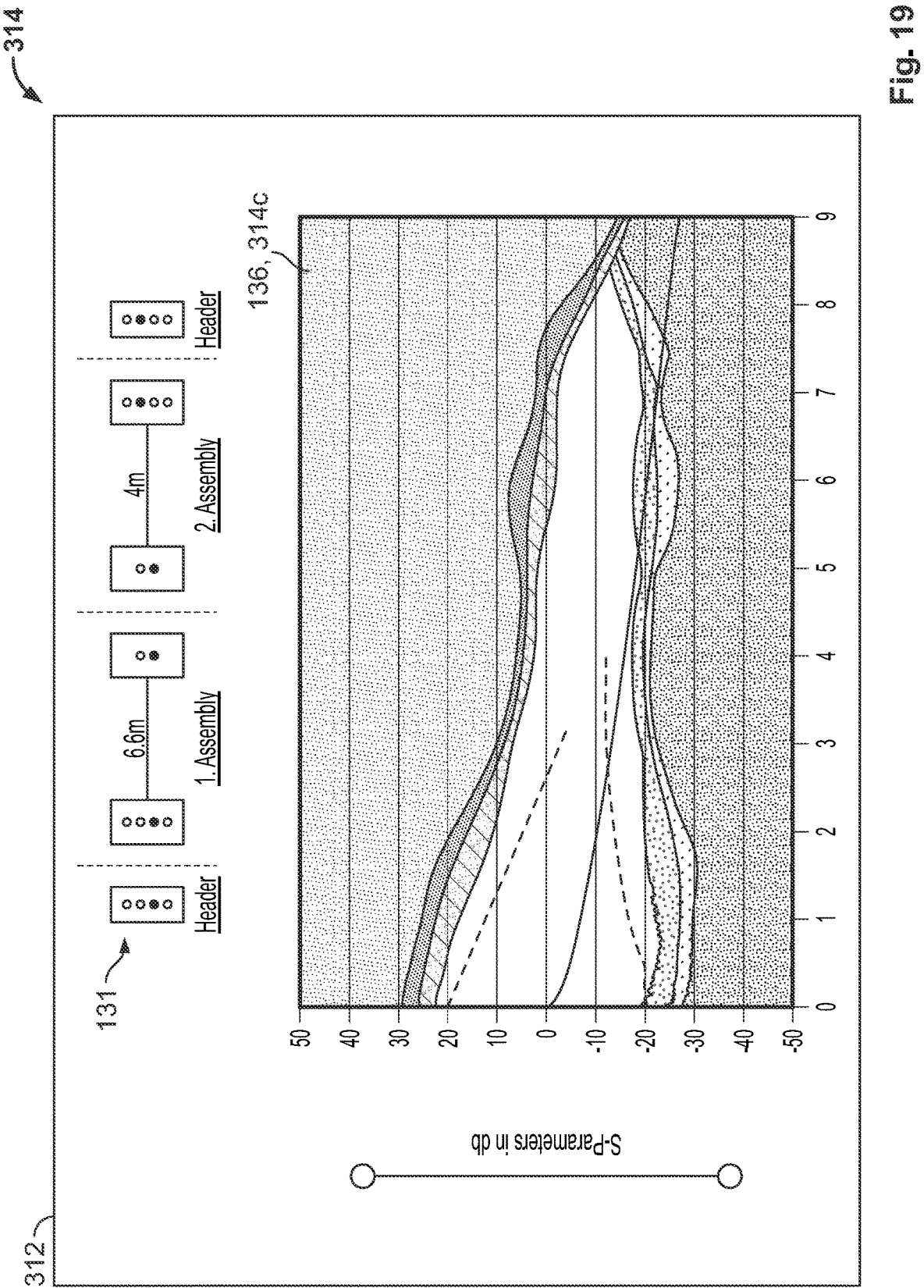
FIG. 19 is another schematic diagram of a plurality of interface data in a step of the simulation process.

In a step 726 shown in FIG. 15, based on the execution of the connectivity model 134 in step 724, the configuration processor 102 outputs connectivity graphical output data 136 to the customer 300. The connectivity graphical output data 136 is stored in the data connectivity simulator 130, as shown in FIG. 2, and is accessible and configurable by the configuration processor 102 to reflect the output of the connectivity model 134. As shown in FIG. 19, the configuration processor 102 sends updated interface data 134 to the customer 300 in the step 726 that shows the connectivity graphical output data 136 as an image 314c. In the shown embodiment, the connectivity graphical output data 136 is a graph of frequency of a data signal in the cable assembly 131 vs. S-parameters of the cable assembly 131 measured in decibels. In other embodiments, the connectivity graphical output data 136 could be any type of interface elements 314 that indicates the results of the connectivity model 134 to the customer 300.

In another embodiment, a modular building process 800 by which the customer 300 uses the connector configuration system 100 and the connector configurator 50 to configure a modular connector 32 will now be described with reference to FIGS. 20-23.

Figure 20:
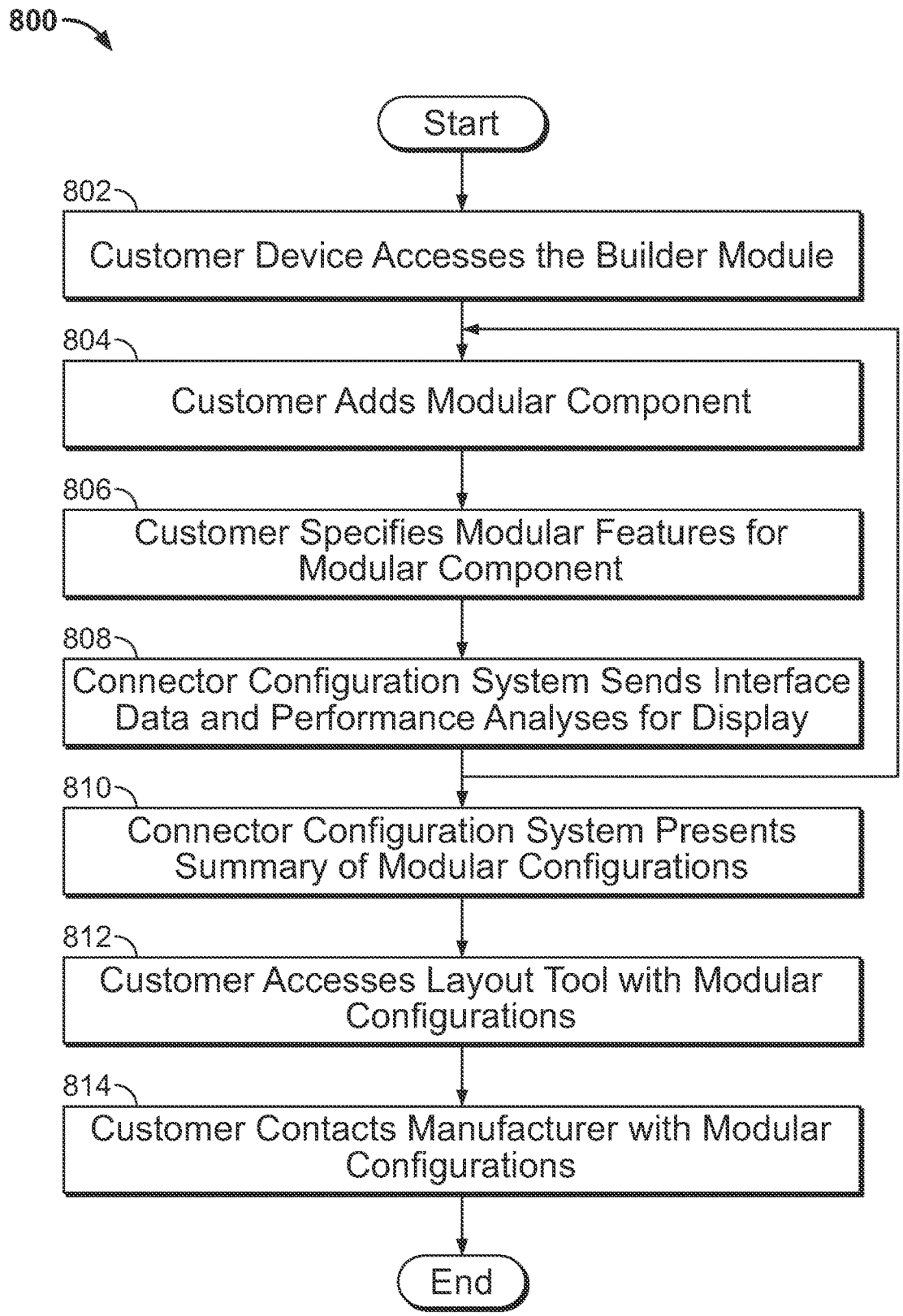
FIG. 20 is a flowchart of a modular building process of the connector configurator.
Figure 21:
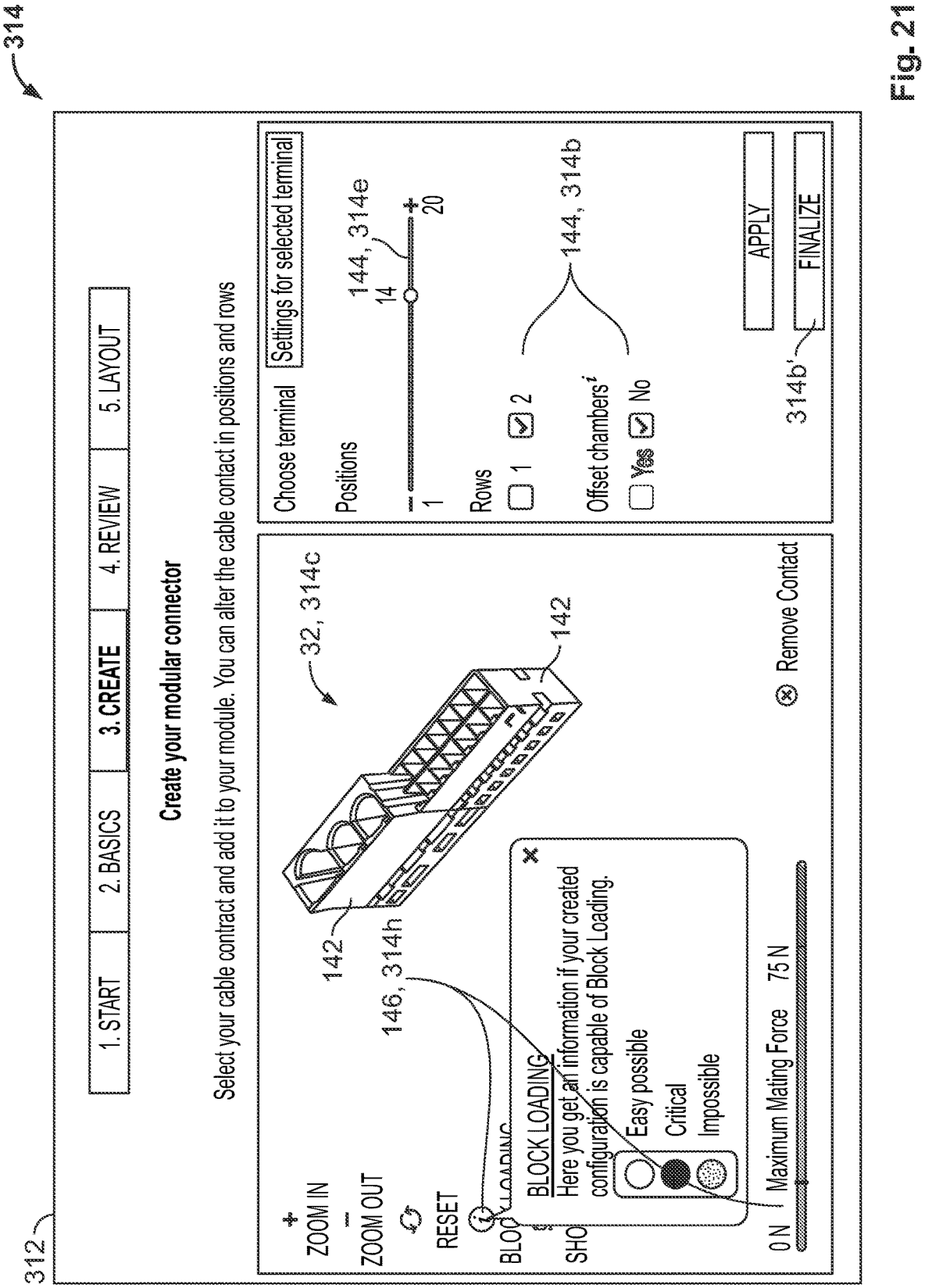
FIG. 21 is a schematic diagram of a plurality of interface data in a step of the modular building process.

In a step 802 shown in FIG. 20, the customer 300 accesses the builder module 140 of the connector configuration system 110 with a request transmitted to the connector configuration system 110 Based on the request from the customer 300, the configuration processor 102 executes the builder module 140 and transmits interface data 314 related to the builder module 140 to be displayed on the display 312, as shown for example in FIG. 21.

The builder module 140 stored on the configuration memory 106, as shown in FIG. 2, includes data on a plurality of modular components 142 each having a plurality of modular features 144 that are selectable by the customer 300. As shown in FIG. 21, the modular components 142 are represented in an image 314c of the interface data 314 and the modular features 144 are represented as other elements of interface data 314 that are adjustable by the customer 300 using the input device 316.

In a step 804 shown in FIG. 20, the customer 300 adds a modular component 142 to the modular connector 32. The modular component 142 for example, as shown in FIG. 21, is a block that can be connected with other modular components 142 to form the modular connector 32. The configuration processor 102 receives the data on the modular component 142 added from the customer 300 and updates the interface data 314 as described above to reflect the added modular component 142

Once the modular component 142 is added, in a step 806 shown in FIG. 20 the customer 300 can specify the modular features 144 of the modular component 142. As shown in FIG. 21, the modular features 144 pertaining to the modular component 142 are physical or structural features of the modular component 142 that are adjustable by the customer 300. In the shown embodiment, the modular features 144 for each modular component 142 include a number of positions of the modular component 142, a number of rows of the modular component 142, and whether the modular component 142 has offset chambers. The modular features 144 shown in the embodiment of FIG. 21 are merely exemplary and, in other embodiments, can include any other structural features of the modular component 142. The modular features 144 in the embodiment shown in FIG. 21 are presented as sliders 134e and/or buttons 314b of the interface data 314 to be manipulated by the customer 300, but could alternatively by any type of interface data 314. In the step 806, the customer 300 specifies the modular features 144 by manipulating the corresponding interface elements 134 with the input device 316.

In a step 808 shown in FIG. 20, based on the specified modular features 144 of the modular component 142 received from the customer 300, the configuration processor 102 executes a plurality of performance analyses 146. The performance analyses 146, shown stored as part of the builder module 140 in FIG. 2, are algorithms created based on test data of a variety of modular components 142 with a variety of modular features 144. The performance analyses 146 receive the modular component 142 and the modular features 144 as inputs and, when executed by the configuration processor 102, determine performance qualities of the modular component 142 with the modular features 144.

In the step 808, the configuration processor 102 sends the updated interface data 314 with the performance analyses 146, shown in FIG. 21, to the customer 300. In the shown embodiment, the performance analyses 146 include an analysis of whether the modular connector 32 is capable of block loading and a mating force required for the modular connector 32. The performance analyses 146, as shown in FIG. 21, are each represented as an icon 314h of the interface data 314 that displays the result of the performance analyses 146 to the customer 300. In other embodiments, the performance analyses 146 could be represented as any type of interface data 314 that relays the results of the performance analyses to the customer 300.

As shown in FIG. 20, the modular building process 800 can loop back through the steps 804, 806, 808 as many times as necessary for the customer 300 to create the desired modular connector 32. The customer 300 can assemble together any number of modular components 142 in any arrangement with any variety of modular features 144 to create the modular connector 32 by continuing to add modular components 142 in step 804 and specifying the modular features 144 for each of the modular components 142 in step 806. In each loop through step 808, the interface data 314 reflects the updated performance analyses 146 related to the currently configured modular connector 32. When the customer 300 is satisfied with the configured modular connector 32, the customer 300 selects an element of the interface data 314, such as a button 134b' shown in FIG. 21, to proceed with the modular building process 800.

Figure 22:
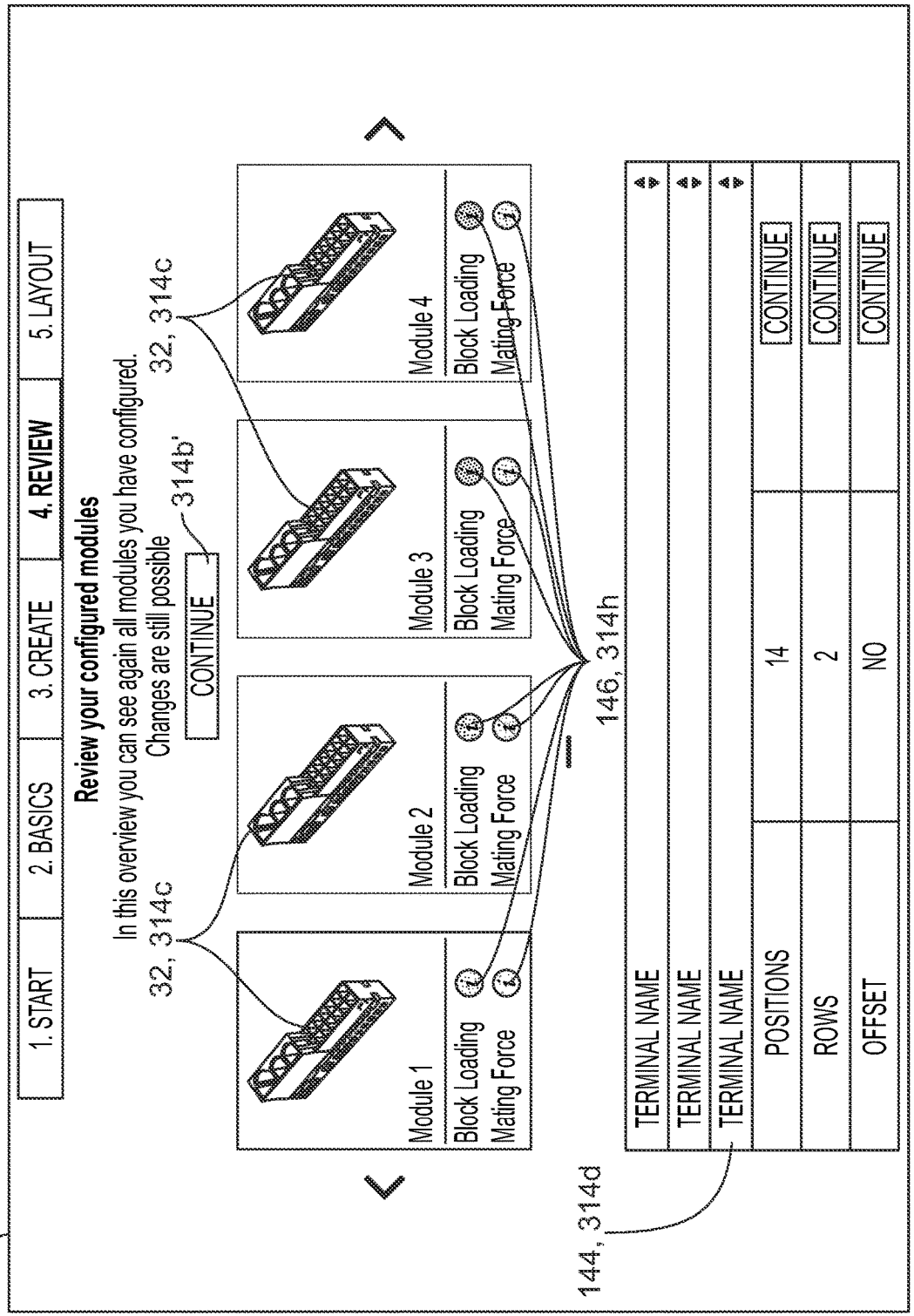
FIG. 22 is another schematic diagram of a plurality of interface data in a step of the modular building process.

In a step 810 of the modular building process 800 shown in FIG. 20, the connector configuration system 100 presents a summary of the modular connectors 32 configured by the customer 300, as shown in FIG. 22. The interface data 314 in the step 810 can include the images 314c of the configured modular connectors 32 along with icons 314h showing the performance analyses 146 for each of the modular connectors 132 and tabs 314d relating to the modular features 144 selected for the modular connectors 132. In other embodiments, the summary of the selections of the modular connectors 132 with the modular features 144 and the performance analyses 146 can be presented in elements of the interface data 314 other than those in the embodiment shown in FIG. 22. When the customer 300 has completed review of the presented summary in step 810, the customer 300 selects an element of the interface data 314, a button 314b' in the embodiment of FIG. 22, that indicates completed review.

Figure 23:
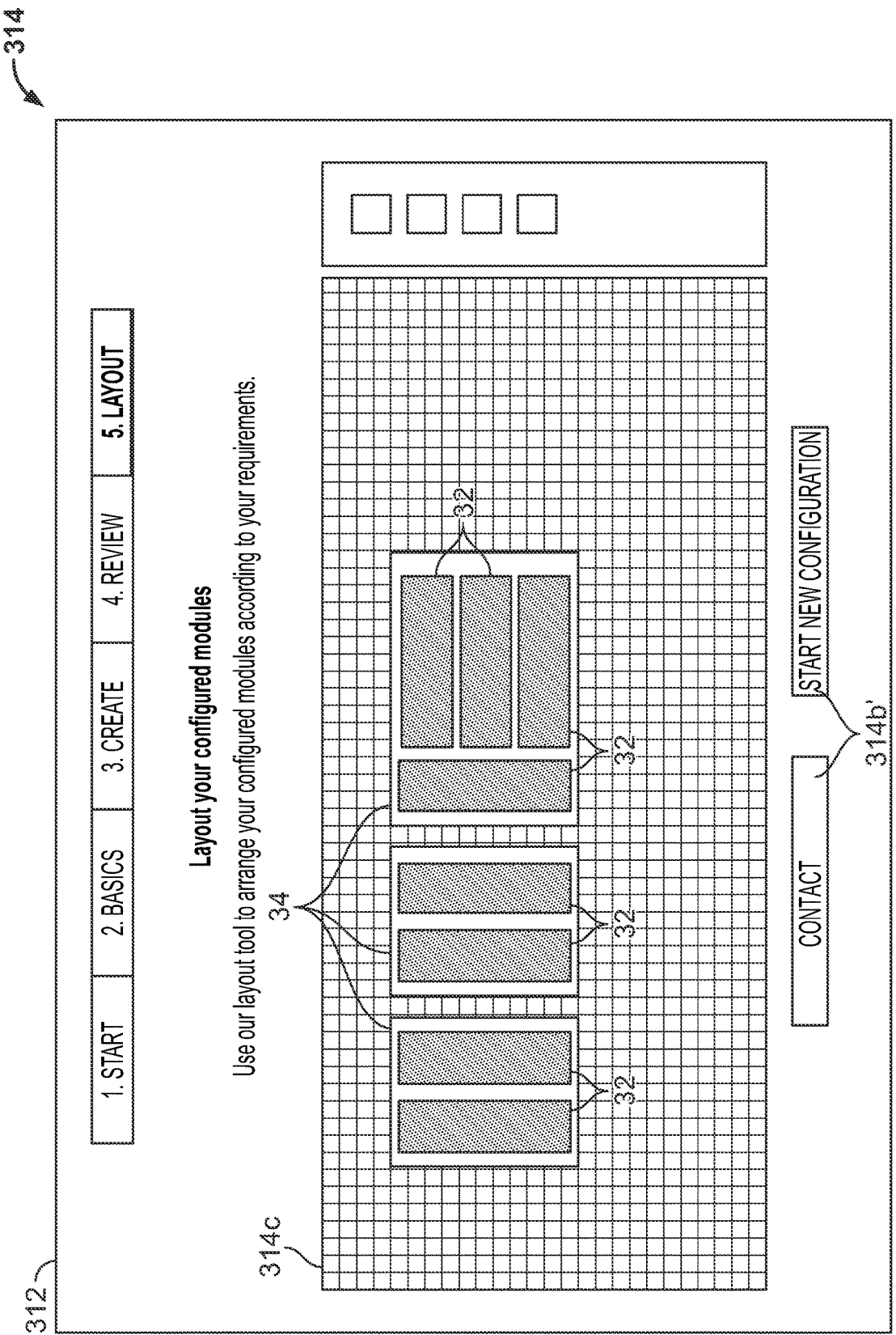
FIG. 23 is another schematic diagram of a plurality of interface data in a step of the modular building process.

In a step 812 of the modular building process 800 shown in FIG. 20, the customer 300 accesses a layout tool 148 to layout the modular connectors 32 configured by the customer 300. The layout tool 148, as shown in FIG. 2, is stored in the builder module 140. The configuration processor 102, upon request from the customer 300, executes the layout tool 148 to send an updated interface data 314, shown in FIG. 23, to the customer 300. The execution of the layout tool 148, as shown in FIG. 23, presents to the customer 300 an image 314c of a schematic layout of the modular connectors 32 configured by the customer 300 on a plurality of schematic printed circuit boards 34. The customer 300 can manipulate the image 314c of the interface data 314 using the input device 316 to re-arrange the modular connectors 32 on the printed circuit boards 34 in order to best determine how the configured modular connectors 32 fit on a variety of printed circuit boards 34.

When the customer 300 has completed laying out the modular connectors 32 in the step 812, the customer 300 selects an element of the interface data 314, a button 314b' in the embodiment of FIG. 23, that indicates completion of usage of the layout tool 148. In a step 814 shown in FIG. 20, the selection of the completion button 314b' contacts the manufacturer 200 with the modular connectors 32 created by the customer 300. In another embodiment, the selection of the completion button 314b' can alternatively or additionally restart the modular building process 800 for a new configuration of a modular connector 32.

The connector configurator 50 having the connector configuration system 100 offers a number of advantages for the customer 300 and the manufacturer 200 in selecting an appropriate connector for the customer 300.

The configurator module 110 allows the customer 300, prior to initiating contact with the manufacturer 200, to create the configured connector 30 in a specific product type 113 having a number of specific features including the outer dimensions 112, the structural features 114, the performance requirements 115, and the personalization options 116. The configurator module 110 thus allows the customer 300 to create a configured connector 30 that is closer and more tailored to the desired application of the customer 300 than is available with the current connector selection process. The execution options 118 further allow the customer 300 to transmit this configured connector 30 to the manufacturer 200, starting a potentially iterative design process closer to the solution and thereby saving time for both the customer 300 and the manufacturer 200. The comparison to existing product configurations 212 additionally allows the customer 300 to discover what appropriate connectors might be currently available, while the simulation module 120 allows the customer 300 to test the configured connector 30 prior to engaging with the manufacturer 200, both further advancing the design process solely through input from the customer 300 and improving efficiency of connector selection. The other execution options 118 also allow the manufacturer 200 to track what types of connectors are being configured by customers 300, including what features may be most desirable for future connector development and which customers 300 are configuring connectors for business development.

The builder module 140 further allows the customer 300 to create a new connector design for their desired application. The customer 300 can accomplish the design of the modular connector 32 on its own behalf with the builder module 140 prior to contacting the manufacturer 200, improving efficiencies similarly to the configurator module 110 while also allowing for customized connector solutions that are not currently available.

What is claimed is:

1. A connector configurator, comprising:
a connector configuration system including a configuration processor and a configurator module executable by the configuration processor;
a customer connected to the connector configuration system and having a display, the customer accessing the configurator module to receive a plurality of interface data displayed on the display, the customer transmitting selections of the interface data to the connector configuration system to create a configured connector using the configurator module, the configurator module displaying the configured connector on the display based on the transmitted selections of the interface data, the customer selects the interface data to choose a plurality of structural features of the configured connector including a number of rows of the configured connector, the connector configuration system has a simulation module executable by the configuration processor, the simulation module simulates usage qualities of the configured connector, the simulation module has a temperature simulator simulating a temperature of the configured connector during use and outputting a temperature graphical output data representative of the temperature as the interface data on the display, the temperature simulator executes a temperature model based on a plurality of temperature components of the configured connector and a plurality of temperature inputs from the customer; and
a manufacturer connected to the connector configuration system and the customer, the manufacturer receives the configured connector and produces a physical version of the configured connector.

2. The connector configurator of claim 1, wherein the customer selection of the interface data includes the selection of one of a plurality of product types for the configured connector.

3. The connector configurator of claim 1, wherein the customer inputs a plurality of outer dimensions of the configured connector into the interface data.

4. The connector configurator of claim 1, wherein the customer selects the interface data to choose a plurality of performance requirements of the configured connector.

5. The connector configurator of claim 4, wherein the performance requirements include at least one of an operating temperature range of the configured connector, a current used with the configured connector, a flammability requirement of the configured connector, and a vibration requirement of the configured connector.

6. The connector configurator of claim 1, wherein the customer selects the interface data to choose a plurality of personalization options of the configured connector.

7. The connector configurator of claim 6, wherein the personalization options include at least one of a color and an engraving of the configured connector.

8. The connector configurator of claim 1, wherein the manufacturer has a configuration database storing the configured connector in association with a customer ID of the customer.

9. The connector configurator of claim 8, wherein the configurator module has a plurality of execution options for the configured connector presented on the interface data and selectable by the customer, the execution options including storing the configured connector in association with the customer ID in a plurality of customer configurations at the connector configuration system.

10. The connector configurator of claim 9, wherein the execution options include forwarding the configured connector to the manufacturer.

11. The connector configurator of claim 9, wherein the manufacturer has an additive manufacturing device, the execution options include creating a 3D print of the configured connector with the additive manufacturing device.

12. The connector configurator of claim 8, wherein the manufacturer has a plurality of existing product configurations stored in the configuration database, the configurator module compares the configured connector to the existing product configurations and determines whether any of the existing product configurations are at least similar to the configured connector.

* * * * *